(12) United States Patent
Xue

(10) Patent No.: US 10,405,370 B2
(45) Date of Patent: Sep. 3, 2019

(54) METHOD AND APPARATUS FOR DATA EXCHANGE BETWEEN GATEWAYS

(71) Applicant: Huawei Technologies Co., Ltd., Shenzhen (CN)

(72) Inventor: Xijun Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/712,411

(22) Filed: Sep. 22, 2017

(65) Prior Publication Data

US 2018/0014355 A1 Jan. 11, 2018

Related U.S. Application Data

(63) Continuation of application No. PCT/CN2015/092973, filed on Oct. 27, 2015.

(30) Foreign Application Priority Data

Mar. 24, 2015 (CN) .......................... 2015 1 0131639

(51) Int. Cl.
*H04W 76/20* (2018.01)
*H04W 12/06* (2009.01)
(Continued)

(52) U.S. Cl.
CPC .............. *H04W 76/20* (2018.02); *H04W 4/80* (2018.02); *H04W 12/06* (2013.01); *H04W 88/16* (2013.01);
(Continued)

(58) Field of Classification Search
CPC ....... H04W 76/20; H04W 88/16; H04W 4/80; H04W 12/06; H04W 88/04; G08C 2201/93; G08C 2201/40
(Continued)

(56) References Cited

U.S. PATENT DOCUMENTS

2009/0063187 A1 3/2009 Johnson et al.
2014/0369275 A1 12/2014 Fleck et al.

FOREIGN PATENT DOCUMENTS

CN 101047982 A 10/2007
CN 102769676 A 11/2012
(Continued)

OTHER PUBLICATIONS

"Personal Area Networking Profile." XP003012348, pp. 1-65, Version 1.0, Bluetooth SIG Confidential (Feb. 14, 2003).
(Continued)

*Primary Examiner* — Eugene Yun

(74) *Attorney, Agent, or Firm* — Leydig, Voit & Mayer, Ltd.

(57) ABSTRACT

A method including: establishing, by a first gateway, a network connection to a second gateway, where the first gateway is configured to manage a human body device of a first user, and the second gateway is configured to manage a human body device of a second user; obtaining, by the first gateway, collaboration information of the second gateway by using the network connection, where the collaboration information includes cellular network performance information; and if the cellular network performance information meets a preset performance condition, using, by the first gateway, the second gateway as an anchor for accessing the Internet, so as to connect the human body device of the first user to the Internet.

19 Claims, 11 Drawing Sheets

(51) Int. Cl.
*H04W 88/16* (2009.01)
*H04W 4/80* (2018.01)
*H04W 88/04* (2009.01)

(52) U.S. Cl.
CPC ..... *G08C 2201/40* (2013.01); *G08C 2201/93* (2013.01); *H04W 88/04* (2013.01)

(58) Field of Classification Search
USPC ........................................................ 455/90.1
See application file for complete search history.

(56) References Cited

FOREIGN PATENT DOCUMENTS

| | | |
|---|---|---|
| CN | 104159218 A | 11/2014 |
| KR | 20100073808 A | 7/2010 |

OTHER PUBLICATIONS

Cheng et al.,"RACOON: A Multiuser QoS Design for Mobile Wireless Body Area Networks," Journal of Medical Systems, vol. 35, No. 5, pp. 1277-1287, XP019988638, Kluwer Academic Publishers-Plenum Publishers (Apr. 5, 2011).

Khan et al.,"ZEQoS: A New Energy and QoS—Aware Routing Protocol for Communication of Sensor Devices in Healthcare System," vol. 10, No. 6, pp. 1-19, XP055445397, International Journal of Distributed Sensor Networks (Jan. 1, 2014).

METHOD AND APPARATUS FOR DATA EXCHANGE BETWEEN GATEWAYS

CROSS-REFERENCE TO RELATED APPLICATIONS

This application is a continuation of International Application No. PCT/CN2015/092973, filed on Oct. 27, 2015, which claims priority to Chinese Patent Application No. 201510131639.8, filed on Mar. 24, 2015. The disclosures of the aforementioned applications are hereby incorporated by reference in their entireties.

TECHNICAL FIELD

Embodiments of the present invention relate to the communications field, and in particular, to a method and an apparatus for data exchange between gateways.

BACKGROUND

Currently, a large quantity of wearable devices (such as a smart band) and implantable devices (such as a heart pacemaker) have been widely applied to the daily life of users; these human body devices (a wearable device and an implantable device are collectively referred to as human body devices in this application) may sense a human body activity and parameters of an external environment, and the human body devices may summarize obtained data, so that users can properly arrange various matters in life according to data provided by the human body devices.

Different types of human body devices have different requirements for communication, for example, a video service of the Google Glass requires a communications network with a high rate and a low delay, and a smart band is configured to sense data (such as a body temperature and a walking speed) of non-human body security, and has no specific requirement for a communications rate and a delay, so that even a communications network with a low rate and a high delay can also meet a requirement of the smart band. In addition, for aspects such as processing of sensed data, and configuration of a human body device, different human body devices also have different requirements.

As human body devices owned by a user increase, a solution to how to manage all these human body devices by using different gateways to meet requirements of the human body devices has not put forward in the prior art.

SUMMARY

Embodiments of the present invention provide a method and an apparatus for data exchange between gateways, so as to meet a requirement of a human body device by means of interaction between gateways such as mobile personal stations.

To achieve the foregoing objective, the following technical solutions are used in the embodiments of the present invention:

According to a first aspect, an embodiment of the present invention provides a method for data exchange between gateways, including:

establishing, by a first gateway, a network connection to a second gateway, where the first gateway is configured to manage a human body device of a first user, and the second gateway is configured to manage a human body device of a second user;

obtaining, by the first gateway, collaboration information of the second gateway by using the network connection, where the collaboration information includes cellular network performance information; and if the cellular network performance information meets a preset performance condition, using, by the first gateway, the second gateway as an anchor for accessing the Internet, so as to connect the human body device of the first user to the Internet.

With reference to the first aspect, in a first possible implementation manner of the first aspect, the cellular network performance information includes radio signal strength and a network uplink/downlink access rate of the second gateway; and the step of the cellular network performance information meets a preset performance condition, using, by the first gateway, the second gateway as an anchor for accessing the Internet includes:

determining, by the first gateway according to the cellular network performance information, whether the radio signal strength of the second gateway meets a preset strength threshold, and whether the network uplink/downlink access rate of the second gateway meets a rate threshold; and if the radio signal strength of the second gateway meets the preset strength threshold, and the network uplink/downlink access rate of the second gateway meets the rate threshold, using, by the first gateway, the second gateway as an anchor for accessing the Internet.

With reference to the first aspect or the first possible implementation manner of the first aspect, in a second possible implementation manner of the first aspect, the using, by the first gateway, the second gateway as an anchor for accessing the Internet includes:

sending, by the first gateway, a cellular network access agent request message to the second gateway, so that the second gateway determines, according to the cellular network access agent request message, whether to provide a cellular network access service to the first gateway; and if the first gateway receives an access response message sent by the second gateway, changing, by the first gateway, an uplink/downlink radio link of the first gateway to a local radio link between the first gateway and the second gateway according to the access response message, so that the second gateway is used as an anchor for the first gateway to access the Internet.

With reference to the first aspect and either possible implementation manner of the first and the second possible implementation manners of the first aspect, in a third possible implementation manner of the first aspect, the collaboration information further includes location information of the second gateway; and after the obtaining collaboration information of the second gateway, the method further includes:

determining, by the first gateway according to the location information of the second gateway, whether a distance between the first gateway and the second gateway meets a preset distance threshold, where the distance threshold includes a lower-limit distance threshold and an upper-limit distance threshold; and if the distance between the first gateway and the second gateway is less than a preset lower-limit distance threshold, sending, by the first gateway, an interference reduction request message to the human body device of the first gateway, so that the human body device of the first gateway decreases transmit power of the human body device; or if the distance between the first gateway and the second gateway is greater than a preset upper-limit distance threshold, sending, by the first gateway, an interference removal notification message to the human body device of the first gateway, to remove a limitation on transmit power of the human body device of the first gateway.

With reference to the third possible implementation manner of the first aspect, in a fourth possible implementation manner of the first aspect, if the distance between the first gateway and the second gateway is less than the preset lower-limit distance threshold, the method further includes:

sending, by the first gateway, an interference reduction collaboration instruction to the second gateway, so that the second gateway sends an interference reduction request message to the human body device of the second gateway according to the interference reduction collaboration instruction.

With reference to the third possible implementation manner of the first aspect, in a fifth possible implementation manner of the first aspect, if the distance between the first gateway and the second gateway is greater than the preset upper-limit distance threshold, the method further includes:

sending, by the first gateway, an interference removal collaboration instruction to the second gateway, so that the second gateway sends an interference removal notification message to the human body device of the second gateway according to the interference removal collaboration instruction.

With reference to the first aspect and any possible implementation manner of the first to the fifth possible implementation manners of the first aspect, in a sixth possible implementation manner of the first aspect, the collaboration information further includes configuration request information, where the configuration request message includes configuration information, and an identifier of the second gateway; and after the obtaining collaboration information of the second gateway, the method further includes:

determining, by the first gateway according to the identifier of the second gateway, whether the second gateway is managed by the first gateway; and if the second gateway is managed by the first gateway, configuring, by the first gateway, the second gateway according to the configuration information.

With reference to the first aspect and any possible implementation manner of the first to the sixth possible implementation manners of the first aspect, in a seventh possible implementation manner of the first aspect, the collaboration information further includes data processing request information, where the data processing request message includes authentication information and a data processing type; and after the obtaining collaboration information of the second gateway, the method further includes:

authenticating, by the first gateway, the second gateway according to the authentication information;

when the second gateway is authenticated by the first gateway successfully, sending, by the first gateway, an authentication success message to the second gateway;

receiving, by the first gateway, data sent by the second gateway; and processing, by the first gateway, the data according to the data type.

With reference to the first aspect and any possible implementation manner of the first to the seventh possible implementation manners of the first aspect, in an eighth possible implementation manner of first aspect, after the establishing, by a first gateway, a network connection to a second gateway, the method further includes:

sending, by the first gateway, user data of the first gateway and configuration data of the first gateway to the second gateway.

According to a second aspect, an embodiment of the present invention provides a method for data exchange between gateways, including:

establishing, by a second gateway, a network connection to a first gateway, where the first gateway is configured to manage a human body device of a first user, and the second gateway is configured to manage a human body device of a second user; and sending, by the second gateway, collaboration information to the first gateway by using the network connection, where the collaboration information includes cellular network performance information, so that the first gateway determines, according to the cellular network performance information, whether to use the second gateway as an anchor for accessing the Internet.

With reference to the second aspect, in a first possible implementation manner of the second aspect, after the sending, by the second gateway, collaboration information to the first gateway, the method further includes:

when receiving a cellular network access agent request message sent by the first gateway, authenticating, by the second gateway, the first gateway according to the cellular network access agent request message; and when the first gateway is authenticated successfully, sending, by the second gateway, an access response message to the first gateway, so that the first gateway changes an uplink/downlink radio link of the first gateway to a local radio link between the first gateway and the second gateway according to the access response message.

With reference to the second aspect or the first possible implementation manner of the second aspect, in a second possible implementation manner of the second aspect, the collaboration information further includes location information of the second gateway, and after the sending, by the second gateway, collaboration information to the first gateway, the method further includes:

if a distance between the first gateway and the second gateway is less than a preset lower-limit distance threshold, receiving, by the second gateway, an interference reduction collaboration instruction sent by the first gateway; and sending, by the second gateway, an interference reduction request message to the human body device of the second gateway according to the interference reduction collaboration instruction.

With reference to the second possible implementation manner of the second aspect, in a third possible implementation manner of the second aspect, if the distance between the first gateway and the second gateway is greater than a preset upper-limit distance threshold, the method further includes:

receiving, by the second gateway, an interference removal collaboration instruction sent by the first gateway; and sending, by the second gateway, an interference removal notification message to the human body device of the second gateway according to the interference removal collaboration instruction.

With reference to the second aspect and any possible implementation manner of the first to the third possible implementation manners of the second aspect, in a fourth possible implementation manner of the second aspect, the collaboration information further includes data processing request information, where the data processing request message includes authentication information and a data processing type; and after the sending, by the second gateway, collaboration information to the first gateway, the method further includes:

receiving, by the second gateway, an authentication success message sent by the first gateway; and sending, by the second gateway, data to the first gateway, so that the first gateway processes the data according to the data processing type.

With reference to the second aspect and any possible implementation manner of the first to the fourth possible implementation manners of the second aspect, in a fifth possible implementation manner of the second aspect, after the establishing, by a second gateway, a network connection to a first gateway, the method further includes:

obtaining, by the second gateway, user data of the first gateway from the first gateway; and receiving, by the second gateway, configuration data of the first gateway that is sent by the first gateway.

According to a third aspect, an embodiment of the present invention provides a gateway, where the gateway includes:

a connection unit, configured to establish a network connection between a first gateway and a second gateway, where the first gateway is configured to manage a human body device of a first user, and the second gateway is configured to manage a human body device of a second user;

an obtaining unit, configured to obtain collaboration information of the second gateway by using the network connection established by the connection establishment unit, where the collaboration information includes cellular network performance information; and a network access unit, configured to: if the cellular network performance information in the collaboration information obtaining unit meets a preset performance condition, use the second gateway as an anchor for accessing the Internet, so as to connect the human body device of the first user to the Internet.

With reference to the third aspect, in a first possible implementation manner of the third aspect, the network access unit is specifically configured to determine, according to the cellular network performance information, whether radio signal strength of the second gateway meets a preset strength threshold, and whether a network uplink/downlink access rate of the second gateway meets a rate threshold; and if the radio signal strength of the second gateway meets the preset strength threshold, and the network uplink/downlink access rate of the second gateway meets the rate threshold, use the second gateway as an anchor for accessing the Internet, where the cellular network performance information includes the radio signal strength and the network uplink/downlink access rate of the second gateway.

With reference to the third aspect or the first possible implementation manner of the third aspect, in a second possible implementation manner of the third aspect, the network access unit is specifically configured to send a cellular network access agent request message to the second gateway, so that the second gateway determines, according to the cellular network access agent request message, whether to provide a cellular network access service to the first gateway; and if an access response message sent by the second gateway is received, change an uplink/downlink radio link of the first gateway to a local radio link between the first gateway and the second gateway according to the access response message, so that the second gateway is used as an anchor for the first gateway to access the Internet.

With reference to the third aspect and either possible implementation manner of the first and the second possible implementation manners of the third aspect, in a third possible implementation manner of the third aspect, the collaboration information in the collaboration information obtaining unit further includes location information of the second gateway, and the gateway further includes a determining unit and a sending unit, where the determining unit is configured to determine, according to the location information of the second gateway, whether a distance between the first gateway and the second gateway meets a preset distance threshold, where the distance threshold includes a lower-limit distance threshold and an upper-limit distance threshold; and the sending unit is configured to: if the distance between the first gateway and the second gateway is less than a preset lower-limit distance threshold, send an interference reduction request message to the human body device of the first gateway, so that the human body device of the first gateway decreases transmit power of the human body device; or if the distance between the first gateway and the second gateway is greater than a preset upper-limit distance threshold, send an interference removal notification message to the human body device of the first gateway, to remove a limitation on transmit power of the human body device of the first gateway.

With reference to the third possible implementation manner of the third aspect, in a fourth possible implementation manner of the third aspect, the sending unit is further configured to: if the distance between the first gateway and the second gateway is less than the preset lower-limit distance threshold, send an interference reduction collaboration instruction to the second gateway, so that the second gateway sends an interference reduction request message to the human body device of the second gateway according to the interference reduction collaboration instruction.

With reference to the third possible implementation manner of the third aspect, in a fifth possible implementation manner of the third aspect, the sending unit is further configured to: if the distance between the first gateway and the second gateway is greater than the preset upper-limit distance threshold, send an interference removal collaboration instruction to the second gateway, so that the second gateway sends an interference removal notification message to the human body device of the second gateway according to the interference removal collaboration instruction.

With reference to the third aspect and any possible implementation manner of the first to the fifth possible implementation manners of the third aspect, in a sixth possible implementation manner of the third aspect, the collaboration information in the collaboration information obtaining unit further includes configuration request information, where the configuration request message includes configuration information, and an identifier of the second gateway; and the gateway further includes a configuration unit, where the determining unit is further configured to determine, according to the identifier of the second gateway, whether the second gateway is managed by the first gateway; and the configuration unit is configured to: if the second gateway is managed by the first gateway, configure the second gateway according to the configuration information.

With reference to the third aspect and any possible implementation manner of the first to the sixth possible implementation manners of the third aspect, in a seventh possible implementation manner of the third aspect, the collaboration information in the collaboration information obtaining unit further includes data processing request information, where the data processing request message includes authentication information and a data processing type; and the gateway further includes an authentication unit, a receiving unit, and a data processing unit, where the authentication unit is configured to authenticate the second gateway according to the authentication information;

the sending unit is further configured to: when the second gateway is authenticated by the first gateway successfully, send an authentication success message to the second gateway;

the receiving unit is configured to receive data sent by the second gateway; and the data processing unit is configured to process the data in the receiving unit.

With reference to the third aspect and any possible implementation manner of the first to the seventh possible implementation manners of the third aspect, in an eighth possible implementation manner of the third aspect, the sending unit is further configured to send user data of the first gateway and configuration data of the first gateway to the second gateway.

According to a fourth aspect, an embodiment of the present invention provides a gateway, where the gateway includes:

a connection unit, configured to establish a network connection between a second gateway and a first gateway, where the first gateway is configured to manage a human body device of a first user, and the second gateway is configured to manage a human body device of a second user; and a sending unit, configured to send collaboration information to the first gateway by using the network connection established by the connection establishment unit, where the collaboration information includes cellular network performance information, so that the first gateway determines, according to the cellular network performance information, whether to use the second gateway as an anchor for accessing the Internet.

With reference to the fourth aspect, in a first possible implementation manner of the fourth aspect, the gateway further include an authentication unit, where the authentication unit is configured to: when a cellular network access agent request message sent by the first gateway is received, authenticate the first gateway according to the cellular network access agent request message; and the sending unit is further configured to: when the first gateway in the authentication unit is authenticated successfully, send an access response message to the first gateway, so that the first gateway changes an uplink/downlink radio link of the first gateway to a local radio link between the first gateway and the second gateway according to the access response message.

With reference to the fourth aspect or the first possible implementation manner of the fourth aspect, in a second possible implementation manner of the fourth aspect, the receiving unit is further configured to: if a distance between the first gateway and the second gateway is less than a preset lower-limit distance threshold, receive an interference reduction collaboration instruction sent by the first gateway; and the sending unit is further configured to send an interference reduction request message to the human body device of the second gateway according to the interference reduction collaboration instruction in the receiving unit, where the collaboration information further includes location information of the second gateway.

With reference to the second possible implementation manner of the fourth aspect, in a third possible implementation manner of the fourth aspect, the receiving unit is further configured to: if the distance between the first gateway and the second gateway is greater than a preset upper-limit distance threshold, receive an interference removal collaboration instruction sent by the first gateway; and the sending unit is further configured to send an interference removal notification message to the human body device of the second gateway according to the interference removal collaboration instruction in the receiving unit.

With reference to the fourth aspect and any possible implementation manner of the first to the third possible implementation manners of the fourth aspect, in a fourth possible implementation manner of the fourth aspect, the receiving unit is further configured to receive an authentication success message sent by the first gateway; and the sending unit is further configured to send data to the first gateway, so that the first gateway processes the data according to the data processing type, where the collaboration information further includes data processing request information, where the data processing request message includes authentication information, and the data processing type.

With reference to the fourth aspect and any possible implementation manner of the first to the fourth possible implementation manners of the fourth aspect, in a fifth possible implementation manner of the fourth aspect, the receiving unit is further configured to obtain user data of the first gateway from the first gateway; and receive configuration data of the first gateway that is sent by the first gateway.

It can be known according to content in the first aspect and the third aspect that, after establishing a network connection to a second gateway, a first gateway obtains cellular network performance information of the second gateway by using the network connection, where the cellular network performance information includes radio signal strength and a network uplink/downlink access rate of the second gateway. In this way, the first gateway can determine, according to the cellular network performance information, a second gateway that meets a preset performance condition, and further use the second gateway as an anchor for accessing the Internet, so as to connect at least one human body device of the first user to the Internet, thereby avoiding a problem that a first gateway in a harsh cellular network environment cannot effectively connect a human body device to the Internet.

It can be known according to content in the second aspect and the fourth aspect that, after establishing a network connection to a first gateway, a second gateway sends, collaboration information, for example, cellular network performance information, of the second gateway to the first gateway by using the network connection, so that the first gateway performs collaboration with the second gateway according to the cellular network performance information in the collaboration information, uses the second gateway as an anchor for accessing the Internet, and enhances an Internet access capability of a human body device of the first gateway. It can be seen that, by means of interaction between the second gateway and the first gateway, the gateways can better meet a requirement of a human body device, so that the human body device can provide a better service to a user, thereby improving user experience.

BRIEF DESCRIPTION OF DRAWINGS

To describe technical solutions in embodiments of the present invention more clearly, the following briefly introduces the accompanying drawings. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes technical solutions in embodiments of the present invention with reference to the accompanying drawings. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
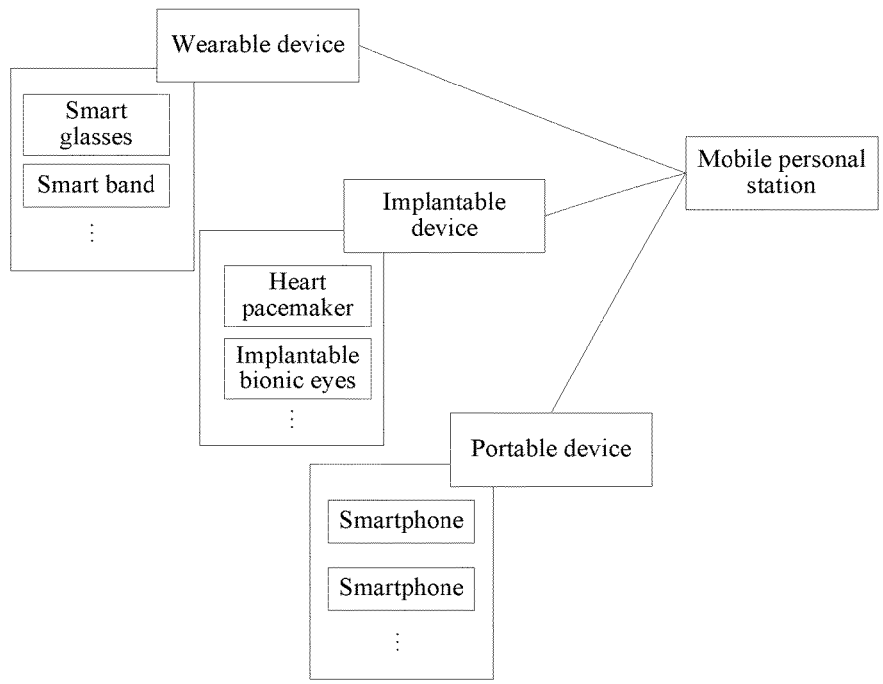
FIG. 1 is a schematic diagram of a connection between a mobile personal station and a human body device according to an embodiment of the present invention.

As human body devices used by each user increase, the human body devices include an implantable device, a wearable device, and a gateway configured to manage all the human body devices inevitably appears. In this specification, such a gateway is referred to as a mobile personal station (MPS), and in the embodiments of the present invention, an example in which a first gateway is a first MPS, and a second gateway is a second MPS is used for description. The MPS is a logical device unit configured to assist a person in performing communication, management, and data analysis on massive human body devices or related devices. As shown in FIG. 1, the MPS may automatically determine a manner of communication (for example, individual networking such as Bluetooth, Wi-Fi (wireless fidelity), ZigBee protocol (a low-power-consumption local area network protocol based on the IEEE802.15.4 standard), or hybrid networking) between human body devices such as an implantable device, a wearable device, and a portable device, and maintain and optimize network running, and may further serve as a communications gateway between a human body device and the Internet. The MPS may be further responsible for management (for example, device configuration and power supply management) of a human body device, and may further perform lightweight data analysis on sensed data (such as a heart rate and blood pressure of a human body; a temperature and use of utilities in a family environment; and a running state of an automobile) collected from a human body and an environment (such as a family and an automobile), and perform data synchronization and collaboration with a cloud data server. The MPS may further perform friendly information exchange (for example, comprehensive data analysis and suggestion such as health warning, and calendar suggestion) with a user by using a smart device (for example, a mobile phone, a tablet computer, or smart glasses).

In the following embodiments of the present invention, multiple mobile personal stations may belong to a same user or different members of a same family. In this way, the multiple mobile personal stations may perform mutual authorization in advance, so that the multiple mobile personal stations perform mutual collaboration operations.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 2:
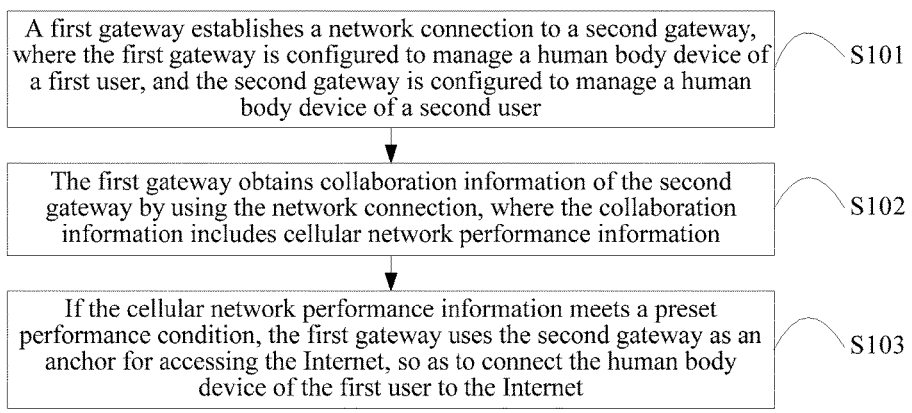
FIG. 2 is a schematic flowchart 1 of a method for data exchange between gateways according to an embodiment of the present invention.

An embodiment of the present invention provides a method for data exchange between gateways. As shown in FIG. 2, the method includes:

S101: A first gateway establishes a network connection to a second gateway, where the first gateway is configured to manage a human body device of a first user, and the second gateway is configured to manage a human body device of a second user.

The first gateway may be specifically a first mobile personal station of the first user, and is configured to perform communication, management, data analysis or the like on one or more human body devices of the first user. Similarly, the second gateway may be specifically a second mobile personal station of the second user, and is configured to perform communication, management, data analysis or the like on one or more human body devices of the second user.

Specifically, the first gateway and the second gateway may establish a network connection by using a local direct connection, or a wide area network connection, so that subsequently, the first gateway and the second gateway perform data exchange on the established network connection.

S102: The first gateway obtains collaboration information of the second gateway by using the network connection, where the collaboration information includes cellular network performance information.

Optionally, the cellular network performance information includes radio signal strength, a network uplink/downlink access rate and the like of the second gateway.

Further, the collaboration information of the second gateway may further include location information, configuration request information, data processing request information and the like of the second gateway, which are described in detail in subsequent embodiments of this application, and details are not described herein again.

S103: If the cellular network performance information meets a preset performance condition, the first gateway uses the second gateway as an anchor for accessing the Internet, so as to connect the human body device of the first user to the Internet.

The determining, by the first gateway, whether the cellular network performance information meets a preset performance condition may specifically include: determining whether the radio signal strength of the second gateway meets the preset strength threshold, and whether the network uplink/downlink access rate of the second gateway meets a rate threshold.

If the cellular network performance information meets the preset performance condition, the first gateway uses the second gateway as an anchor for accessing the Internet, so as to connect the human body device that is of the first user and that is managed by the first gateway to the Internet, to further enhance an Internet access capability of the first mobile personal station. For the method in which the first gateway uses the second gateway as the anchor for accessing the Internet, reference may be made to step S301 to step S311 in the following embodiments, and details are not described herein again.

Further, as described in step S102, the collaboration information of the second gateway that is obtained by the first gateway may further include the location information, the configuration request information, the data processing request information and the like of the second gateway. Therefore, in another possible implementation manner of this embodiment of the present invention, an example in which the first gateway is the first mobile personal station, and the second gateway is the second mobile personal station is used, and the method includes:

S201: A first mobile personal station establishes a network connection to a second mobile personal station.

S202: The first mobile personal station obtains collaboration information of the second mobile personal station, where the collaboration information includes at least one of cellular network performance information, location information, configuration request information, or data processing request information that is of the second mobile personal station.

S203: The first mobile personal station performs a corresponding operation according to the collaboration information.

The first mobile personal station and the second mobile personal station may be any two mobile personal stations in multiple mobile personal stations that have been mutually authorized.

Specifically, the first mobile personal station is connected to the second mobile personal station by establishing the network connection, such as a local direct connection or a wide area network connection, and obtains the collaboration information of the second mobile personal station, and performs the corresponding collaboration operation according to the collaboration information. For example, the first mobile personal station may perform collaboration with the second mobile personal station according to the cellular network performance information in step 201, and use the second mobile personal station as an anchor for accessing the Internet, to further enhance an Internet access capability of the first mobile personal station, or may perform collaboration with the second mobile personal station according to the location information of the second mobile personal station in step 201, to reduce interference between the first mobile personal station and the second mobile personal station, or may perform collaboration with the second mobile personal station according to the configuration request information in step 201, to enhance a configuration capability of the second mobile personal station, or may perform collaboration with the second mobile personal station according to the data processing request information in step 201, to enhance a data analysis capability of the first mobile personal station.

In this way, by means of the foregoing method, by means of interaction between mobile personal stations, the mobile personal stations can better meet a requirement of a human body device, so that the human body device can provide a better service to a user, thereby improving user experience.

The following uses a specific example to describe this embodiment of the present invention in detail:

For multiple mobile personal stations, network environments of the mobile personal stations may be different. To avoid that a mobile personal station in a relatively poor radio environment cannot access the Internet, in a possible implementation manner of this embodiment of the present invention, the first mobile personal station obtains collaboration information of the second mobile personal station, where the collaboration information includes the cellular network performance information of the second mobile personal station.

Further, the first mobile personal station determines, according to the cellular network performance information, that the second mobile personal station meets a preset performance condition, and sends a cellular network access agent request message to the second mobile personal station, so that the second mobile personal station determines, according to the cellular network access agent request message, whether to provide a cellular network access service to the first mobile personal station.

Optionally, the cellular network performance information includes radio signal strength and a network uplink/downlink access rate of the second mobile personal station, the determining, by the first mobile personal station according to the cellular network performance information, that the second mobile personal station meets a preset performance condition specifically includes: determining that the radio signal strength of the second mobile personal station meets a preset strength threshold, and that the network uplink/downlink access rate of the second mobile personal station meets a rate threshold.

Figure 3:
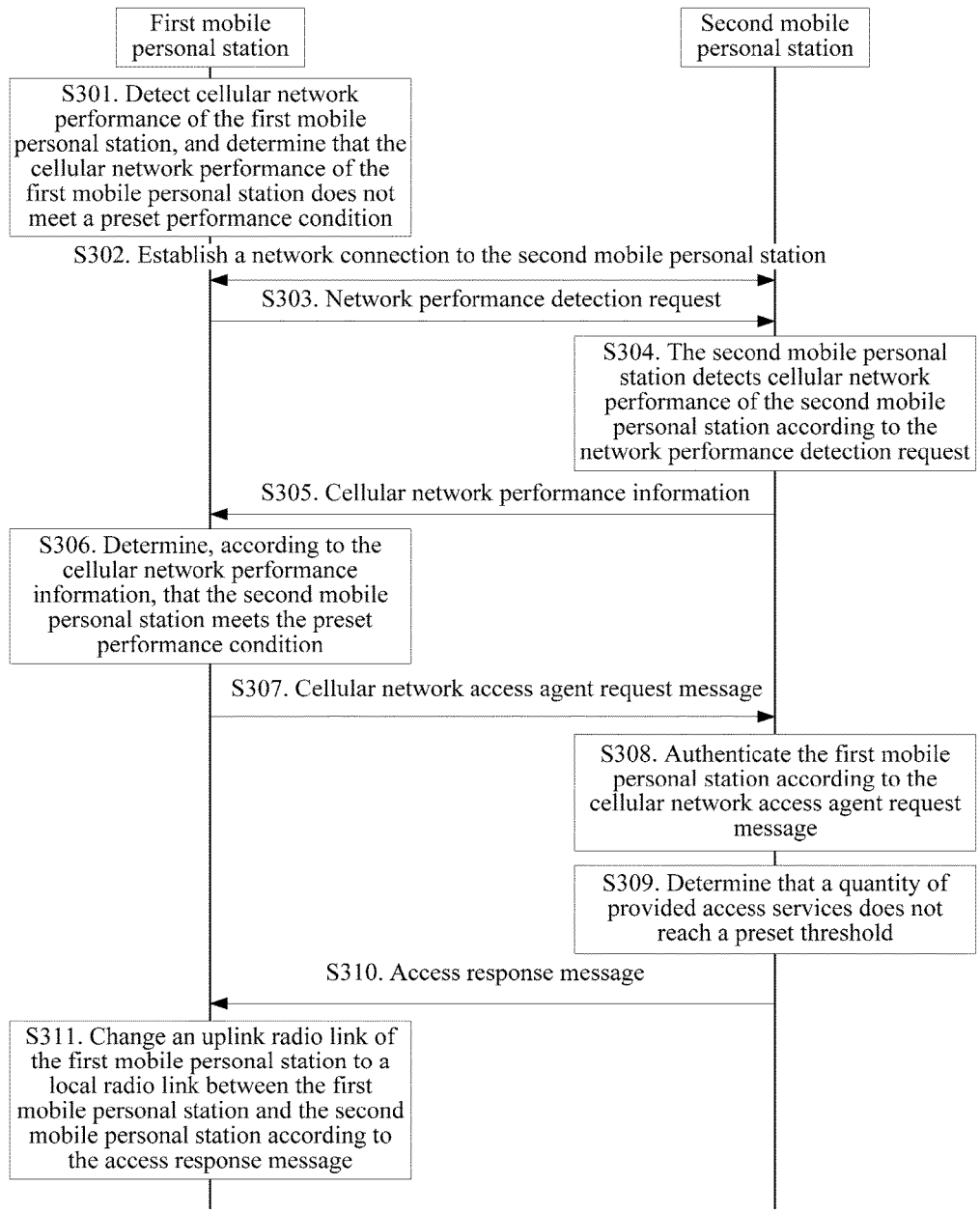
FIG. 3 is a schematic flowchart 2 of a method for data exchange between gateways according to an embodiment of the present invention.

Exemplarily, FIG. 3 is a schematic diagram of interaction between the first mobile personal station and the second mobile personal station, which includes:

S301: A first mobile personal station detects cellular network performance of the first mobile personal station, and determines that the cellular network performance of the first mobile personal station does not meet a preset performance condition.

That is, network performance of the first mobile personal station is relatively poor, and the first mobile station may not access the Internet, where the performance condition may be preset by a user, for example, radio signal strength of the first mobile personal station is less than a preset strength threshold, or a network uplink/downlink access rate of the first mobile personal station is less than a rate threshold. In this case, the first mobile personal station performs step S302.

S302: The first mobile personal station establishes a network connection to a second mobile personal station.

S303: The first mobile personal station sends a network performance detection request to the second mobile personal station.

S304: The second mobile personal station detects cellular network performance of the second mobile personal station according to the network performance detection request.

S305: The second mobile personal station sends cellular network performance information of the second mobile personal station to the first mobile personal station.

S306: The first mobile personal station determines, according to the cellular network performance information, that the second mobile personal station meets the preset performance condition.

S307: The first mobile personal station sends a cellular network access agent request message to the second mobile personal station.

S308: The second mobile personal station authenticates the first mobile personal station according to the cellular network access agent request message.

Exemplarily, when multiple mobile personal stations perform mutual authorization, the mobile personal stations may reserve information in the mobile personal stations, for example, an identifier of an authorized mobile personal station, where the reserved information is used for information authentication. In this way, the cellular network access agent request message may include an identifier of the first mobile personal station, and the second mobile personal station authenticates the first mobile personal station according to the identifier of the first mobile personal station. If the identifier of the first mobile personal station conforms to reserved information in the second mobile personal station, the authentication is successful.

S309: The second mobile personal station determines that a quantity of provided access services does not reach a preset threshold.

Specifically, after authenticating the first mobile personal station successfully, the second mobile personal station may further determine, according to the quantity of mobile personal stations that are of the second mobile personal station and that provide access services, whether to provide an access service to the first mobile personal station. That is, if the second mobile personal station may provide an access service to N other mobile personal stations, and the quantity of mobile personal stations that are of the second mobile personal station and that have provided access services is less than N, the second mobile personal station may provide an access service to the first mobile personal station.

S310: The second mobile personal station sends an access response message to the first mobile personal station.

S311: The first mobile personal station changes an uplink/downlink radio link of the first mobile personal station to a local radio link between the first mobile personal station and the second mobile personal station according to the access response message.

In this way, the first mobile personal station performs local connection to the second mobile personal station, and the first mobile personal station uses the second mobile personal station as an anchor for accessing the Internet, thereby avoiding that the first mobile personal station cannot access the Internet due to a relatively poor radio environment.

It should be noted that, if the first mobile personal station is not authenticated by the second mobile personal station successfully, or the quantity of access services provided by the second mobile personal station has reached an upper limit value, after receiving an access reject message sent by the second mobile personal station, the first mobile personal station may send a cellular network access agent request message to another mobile personal station.

In a possible implementation manner of this embodiment of the present invention, the first mobile personal station may first obtain cellular network performance information of at least one neighboring mobile personal station, sort network performance of mobile personal stations, to generate a network performance table, and sequentially send, according to the network performance table, a cellular network access agent request message to mobile personal stations that meet the preset performance condition, until a mobile personal station determines to provide an access service to the first mobile personal station.

In addition, the steps shown in FIG. 3 are only examples for description. For ease of description, the steps are described as a series of action combinations, but a person skilled in the art should know that, the present invention is not limited by a sequence of described actions, and secondly, a person skilled in the art should also know that, the embodiments described in the specification are preferred embodiments, and the involved actions are not necessarily needed by the embodiments of the present invention.

It can be seen that, after establishing a network connection to a second gateway, a first gateway obtains cellular network performance information of the second gateway by using the network connection, where the cellular network performance information includes radio signal strength and a network uplink/downlink access rate of the second gateway. In this way, the first gateway can determine, according to the cellular network performance information, a second gateway that meets a preset performance condition, and further use the second gateway as an anchor for accessing the Internet, so as to connect at least one human body device of the first user to the Internet, thereby avoiding a problem that a first gateway in a harsh cellular network environment cannot effectively connect a human body device to the Internet.

For multiple mobile personal stations, because distances between the mobile personal stations are relatively short, interference may exist. For example, when a same user carries multiple mobile personal stations around, to avoid interference between the multiple mobile personal stations, in another possible implementation manner of this embodiment of the present invention, the collaboration information of the second mobile personal station that is obtained by the first mobile personal station includes location information of the second mobile personal station.

Further, the first mobile personal station determines, according to the location information, that a distance between the first mobile personal station and the second mobile personal station meets a preset distance threshold, where the distance threshold may specifically include a lower-limit distance threshold and an upper-limit distance threshold, and further sends an interference reduction request message to a human body device of the first mobile personal station, and/or, sends an interference reduction collaboration instruction to the second mobile personal station, so that the second mobile personal station sends an interference reduction request message to a human body device of the second mobile personal station according to the interference reduction collaboration instruction.

The interference reduction request message may be specifically used to instruct the human body device to decrease transmit power, and/or, switch a transmission channel.

It should be noted that, when the distance between the first mobile personal station and the second mobile personal station is relatively short, a signal sent by the human body device managed by the first mobile personal station may be received by the second mobile personal station, causing interference to the second mobile personal station. Similarly, a signal sent by the human body device managed by the second mobile personal station may also cause interference to the first mobile personal station. In addition, if a transmission channel of the human body device managed by the first mobile personal station is close to a transmission channel of the human body device managed by the second mobile personal station, interference may also be caused.

In this embodiment of the present invention, when detecting that the distance between the first mobile personal station and the second mobile personal station reaches a preset lower-limit distance threshold, for example, when the distance is within 20 meters, the first mobile personal station may send an interference reduction request message to the human body device managed by the first mobile personal station, to instruct the human body device to decrease transmit power, and/or, switch a transmission channel, so as to avoid generating interference to the second mobile personal station. In addition, the first mobile personal station may further send an interference reduction collaboration instruction to the second mobile personal station, and the two devices perform collaboration adjustment, thereby further reducing a possibility of generating interference.

In addition, if the first mobile personal station determines, according to the location information, that the distance between the first mobile personal station and the second mobile personal station meets a preset upper-limit distance threshold, for example, when the distance is beyond 50 meters, the first mobile personal station may send an interference removal notification message to the human body device of the first mobile personal station, and/or, send an interference removal collaboration instruction to the second mobile personal station, so that the second mobile personal station sends an interference removal notification message to the human body device of the second mobile personal station according to the interference removal collaboration instruction.

Figure 4:
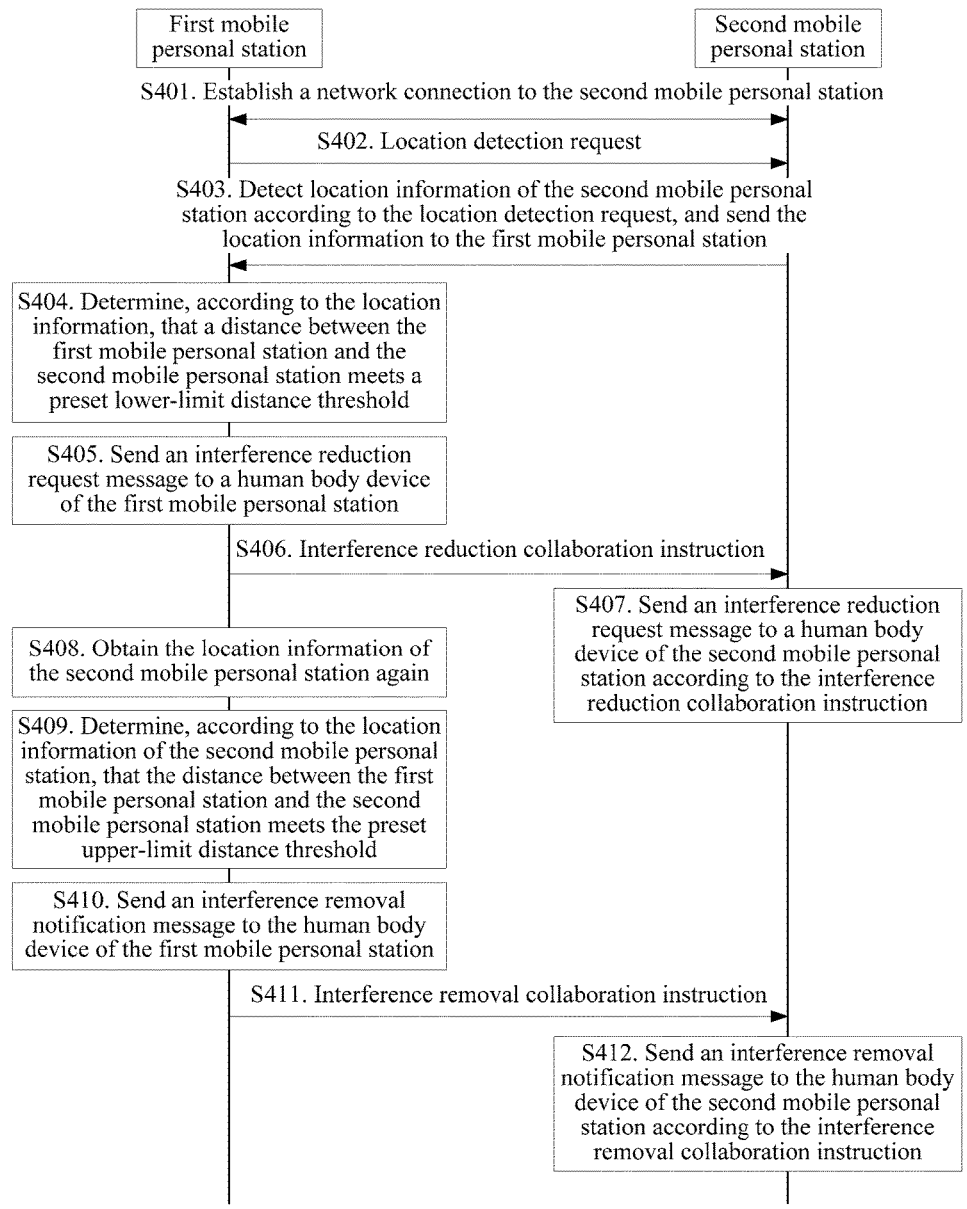
FIG. 4 is a schematic flowchart 3 of a method for data exchange between gateways according to an embodiment of the present invention.

Exemplarily, FIG. 4 is a schematic diagram of interaction between the first mobile personal station and the second mobile personal station, which includes:

S401: The first mobile personal station establishes a network connection to the second mobile personal station.

S402: The first mobile personal station sends a location detection request to the second mobile personal station.

S403: The second mobile personal station detects location information of the second mobile personal station according to the location detection request, and sends the location information to the first mobile personal station.

S404: The first mobile personal station determines, according to the location information, that a distance between the first mobile personal station and the second mobile personal station meets a preset upper-limit distance threshold.

Optionally, the upper-limit distance threshold may be preset according to an average height of users.

S405: The first mobile personal station sends an interference reduction request message to a human body device of the first mobile personal station.

When the distance between the first mobile personal station and the second mobile personal station reaches the preset upper-limit distance threshold, the first mobile personal station sends an interference reduction request message to the human body device managed by the first mobile personal station, to instruct the human body device of the first mobile personal station to decrease transmit power, and/or, switch a transmission channel, to avoid generating interference to the second mobile personal station.

S406: The first mobile personal station sends an interference reduction collaboration instruction to the second mobile personal station.

S407: The second mobile personal station sends an interference reduction request message to a human body device of the second mobile personal station according to the interference reduction collaboration instruction.

In addition, when the distance between the first mobile personal station and the second mobile personal station reaches the preset upper-limit distance threshold, the first mobile personal station may further send an interference reduction collaboration instruction to the second mobile personal station, so that the second mobile personal station sends an interference reduction request message to the human body device of the second mobile personal station according to the interference reduction collaboration instruction.

Similarly, the interference reduction request message is used to instruct the human body device to decrease transmit power, and/or, switch a transmission channel.

S408: The first mobile personal station obtains the location information of the second mobile personal station again.

It should be noted that, the first mobile personal station may obtain the location information of the second mobile personal station according to a particular period, where the period may be preset by a user.

S409: The first mobile personal station determines, according to the location information of the second mobile personal station, that the distance between the first mobile personal station and the second mobile personal station meets the preset upper-limit distance threshold.

S410: The first mobile personal station sends an interference removal notification message to the human body device of the first mobile personal station.

Specifically, the human body device of the first mobile personal station may restore the transmit power of the human body device to preset power according to the interference removal notification message, for example, restore the transmit power of the human body device to transmit power used before step 407.

S411: The first mobile personal station sends an interference removal collaboration instruction to the second mobile personal station.

S412: The second mobile personal station sends an interference removal notification message to the human body device of the second mobile personal station according to the interference removal collaboration instruction.

Similar to step S410, the human body device of the second mobile personal station may restore the transmit power of the human body device to preset power according to the interference removal notification message, for example, restore the transmit power of the human body device to transmit power used before step 407.

Specifically, according to the foregoing step S408 to step S412, after the human body device decreases the transmit power, and/or, switches the transmission channel, if the distance between the two mobile personal stations increases, for example, reaches an upper-limit distance threshold preset by a user, the human body device may restore to previous transmit power, and/or, a previous transmission channel of the human body device, which does not affect optimal running performance of the human body device, thereby improving user experience.

In addition, the steps shown in FIG. 4 are only examples for description. For ease of description, the steps are described as a series of action combinations, but a person skilled in the art should know that, the present invention is not limited by a sequence of described actions, and secondly, a person skilled in the art should also know that, the embodiments described in the specification are preferred embodiments, and the involved actions are not necessarily needed by the embodiments of the present invention.

In a same family, an adult may need to perform configuration management on mobile personal stations carried by an old man and a child. To meet such a requirement, in still another possible implementation manner of this embodiment of the present invention, the collaboration information of the second mobile personal station that is obtained by the first mobile personal station includes configuration request information of the second mobile personal station.

Specifically, the configuration request information may include configuration information, and an identifier of the second mobile personal station, and the first mobile personal station determines, according to the identifier of the second mobile personal station, that the second mobile personal station is a configuration management station of the first mobile personal station, that is, determines that the second mobile personal station is managed by the first mobile personal station, and configures the first mobile personal station according to the configuration information.

The user may preset the second mobile personal station as a configuration management station of the first mobile personal station, and the first mobile personal station records the identifier of the second mobile personal station. In this way, if a mobile personal station identifier in the configuration request information received by the first mobile personal station conforms to the recorded identifier, the authentication is successful, and further, configuration is performed according to the configuration information in the configuration request information.

Figure 5:
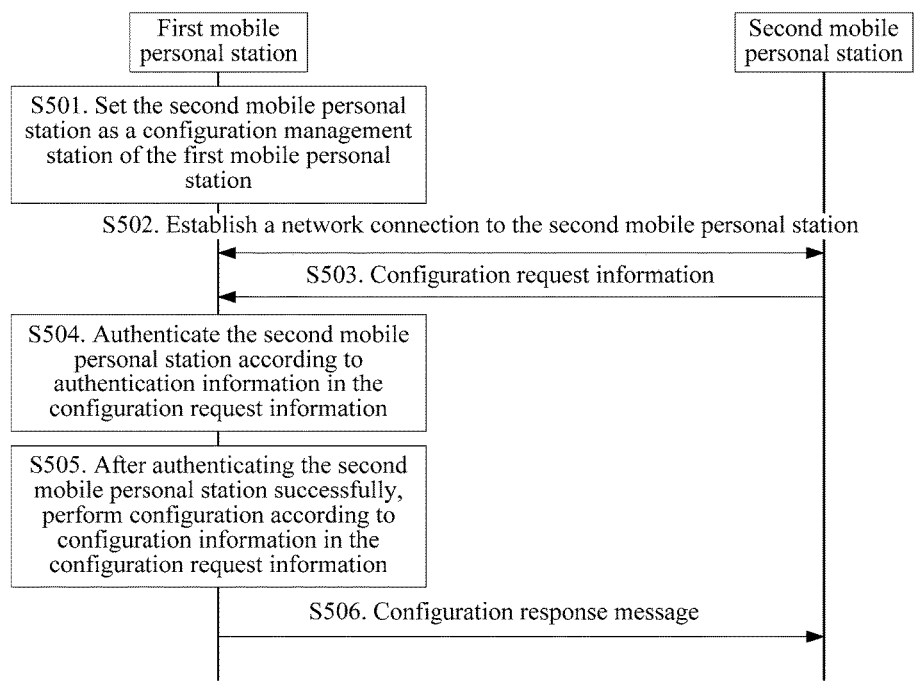
FIG. 5 is a schematic flowchart 4 of a method for data exchange between gateways according to an embodiment of the present invention.

Exemplarily, FIG. 5 is a schematic diagram of interaction between the first mobile personal station and the second mobile personal station, which includes:

S501: Set a second mobile personal station as a configuration management station of a first mobile personal station.

S502: The first mobile personal station establishes a network connection to the second mobile personal station.

It should be noted that, a distance between the first mobile personal station and the second mobile personal station may be relatively long; therefore, the network connection established between the two mobile personal stations may be a wide area network connection.

S503: The second mobile personal station sends configuration request information to the first mobile personal station.

The configuration request information may include configuration information of the second mobile personal station, and an identifier of the second mobile personal station. Specifically, the configuration information of the second mobile personal station may include various parameters of the second mobile personal station during running, such as a startup time of the second mobile personal station.

S504: The first mobile personal station authenticates the second mobile personal station according to authentication information in the configuration request information.

S505: After authenticating the second mobile personal station successfully, the first mobile personal station performs configuration according to configuration information in the configuration request information.

Specifically, after the first mobile personal station authenticates the second mobile personal station successfully, the first mobile personal station may modify the various parameters in the configuration information of the second mobile personal station during running, for example, modify a network standard of the second mobile personal station, or modify a time at which the second mobile personal station accesses the Internet.

S506: The first mobile personal station sends a configuration response message to the second mobile personal station.

In this way, by means of the method steps shown in FIG. 5, the second mobile personal station may remotely configure and manage the first mobile personal station, thereby improving user experience.

In addition, the steps shown in FIG. 5 are only examples for description. For ease of description, the steps are described as a series of action combinations, but a person skilled in the art should know that, the present invention is not limited by a sequence of described actions, and secondly, a person skilled in the art should also know that, the embodiments described in the specification are preferred embodiments, and the involved actions are not necessarily needed by the embodiments of the present invention.

In a same family, an adult may also need to perform analysis and monitoring, such as network information filtering, on data of mobile personal stations carried by an old man and a child. To meet such a requirement, in still another possible implementation manner of this embodiment of the present invention, the collaboration information of the second mobile personal station that is obtained by the first mobile personal station includes data processing request information of the second mobile personal station.

The data processing request message includes authentication information and a data processing type. When the collaboration information obtained by the first mobile personal station includes the authentication information, the first mobile personal station authenticates the second mobile personal station according to the authentication information, after the authentication is successful, sends an authentication success message to the second mobile personal station, and receives data sent by the second mobile personal station, and processes the received data according to the data type, where the data sent by the second mobile personal station may be specifically sensed data generated by a human body device connected to the second mobile personal station, or a result of analysis on sensed data by the second mobile personal station.

Figure 6:
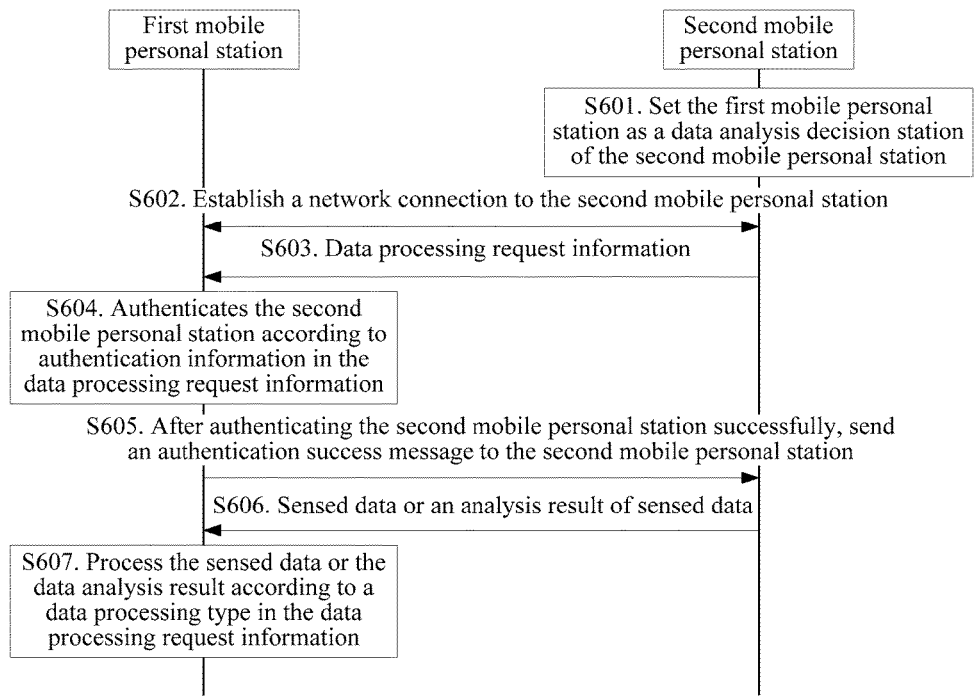
FIG. 6 is a schematic flowchart 5 of a method for data exchange between gateways according to an embodiment of the present invention.

Exemplarily, FIG. 6 is a schematic diagram of interaction between the first mobile personal station and the second mobile personal station, which includes:

S601: Set a first mobile personal station as a data analysis decision station of a second mobile personal station.

S602: The first mobile personal station establishes a network connection to the second mobile personal station.

It should be noted that, a distance between the first mobile personal station and the second mobile personal station may be relatively long; therefore, the network connection established between the two mobile personal stations may be a wide area network connection.

S603: The second mobile personal station sends data processing request information to the first mobile personal station.

The data processing request message includes authentication information and a data processing type, so that the first mobile personal station authenticates the second mobile personal station according to the authentication information, so as to further perform corresponding data processing for the data processing type.

S604: The first mobile personal station authenticates the second mobile personal station according to authentication information in the data processing request information.

S605: After authenticating the second mobile personal station successfully, the first mobile personal station sends an authentication success message to the second mobile personal station.

S606: The second mobile personal station sends sensed data or an analysis result of sensed data to the first mobile personal station.

Specifically, the second mobile personal station may directly send sensed data (such as a heart rate and blood pressure of a human body; a temperature and use of utilities in a family environment; and a running state of an automobile) collected from a human body and an environment (such as a family and an automobile) to the first mobile personal station to request data processing; and the second mobile personal station may also perform data analysis on the collected sensed data, and then send an analysis result of the sensed data to the first mobile personal station to request further data processing.

S607: The first mobile personal station processes the sensed data or the analysis result of the data according to the data processing type in the data processing request information.

For example, if the analysis result of the sensed data that is sent by the second mobile personal station to the first mobile personal station is that a user of the second mobile personal station falls over at home, and a data processing type of the analysis result is an emergent event, the first mobile personal station may provide an emergency policy to the analysis result according to the data processing type of the emergent event, for example, the first mobile personal station gives an alarm to a user of the first mobile personal station, and provides a list of hospitals nearest to the user of the second mobile personal station, so that the user of the first mobile personal station rapidly processes the emergent event.

Specifically, the first mobile personal station may pre-store a data decision model base, where the data decision model base may include data decision models of multiple data processing types, for example, a data decision model of an analysis result of a blood pressure value and a blood glucose value, for example, in which range a change of a relative value of a blood pressure value and a blood glucose value is normal, or in which range a change of a relative value of a blood pressure value and a blood glucose value is abnormal; for another example, a data decision model of an analysis result of posture change data and a heart rate value, for example, an analysis result of posture change data displays that a user is in an intense exercise state, and if an analysis result of a heart rate value displays that a heart rate of a user increases, it is a normal phenomenon. In this way, the first mobile personal station may process the sensed data or the data analysis result according to a data decision model in the data analysis model base, and according to a data processing type in the data processing request information.

In this way, by means of the method steps shown in FIG. 6, the first mobile personal station may remotely perform data analysis processing on the second mobile personal station, thereby improving user experience.

In addition, the steps shown in FIG. 6 are only examples for description. For ease of description, the steps are described as a series of action combinations, but a person skilled in the art should know that, the present invention is not limited by a sequence of described actions, and secondly, a person skilled in the art should also know that, the embodiments described in the specification are preferred embodiments, and the involved actions are not necessarily needed by the embodiments of the present invention.

Figure 7:
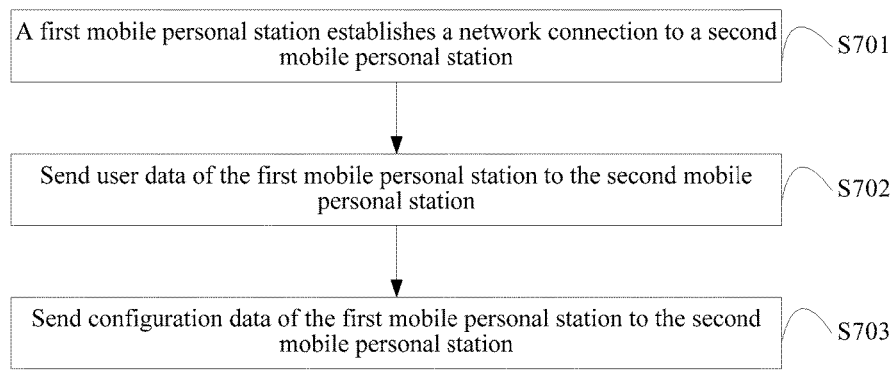
FIG. 7 is a schematic flowchart 6 of a method for data exchange between gateways according to an embodiment of the present invention.

When one user has multiple mobile personal stations, the mobile personal stations have a requirement for function migration, that is, the mobile personal stations may share user data and configuration data of a same user. To meet such a requirement, as shown in FIG. 7, in still another possible implementation manner of this embodiment of the present invention, the method includes:

S701: A first mobile personal station establishes a network connection to a second mobile personal station.

S702: Send user data of the first mobile personal station to the second mobile personal station.

S703: Send configuration data of the first mobile personal station to the second mobile personal station.

Specifically, if one user has multiple mobile personal stations, the mobile personal stations have a requirement for function migration. For example, if the first mobile personal station lacks electricity and needs to be changed to the second mobile personal station, by means of the foregoing method, the configuration data and the user data of the first mobile personal station may be migrated to the second mobile personal station, to complete function migration, thereby improving user experience.

In a possible implementation manner of this embodiment of the present invention, the first mobile personal station may directly send the user data and the configuration data to the second mobile personal station by using a direct connection network.

In another possible implementation manner of this embodiment of the present invention, after establishing a connection to the second mobile personal station, the first mobile personal station determines that a cloud server saves the user data of the first mobile personal station, and sends a push request message to the cloud server, so that the cloud server sends the user data of the first mobile personal station to the second mobile personal station according to the push request message. After receiving a push response message sent by the cloud server, the first mobile personal station sends the configuration data of the first mobile personal station to the second mobile personal station.

It should be noted that, this embodiment of the present invention may provide one or more cloud servers, for example, a cloud platform formed by multiple cloud servers, where the cloud platform may store information and historical data of each user, and when performing cloud computing, the cloud platform may perform deep and accurate calculation by invoking the information and the historical data of each user.

Specifically, the cloud platform may be configured to store sensed data generated by each human body device; and perform data analysis on sensed data collected from each human body device, and extract a change feature and rule of the data. For example, the cloud platform may calculate a change rule of blood pressure of a human body in a year, a change rule of alcohol content of a human body in a year, or the like. In addition, the cloud platform may also perform association analysis according to a data analysis result, and provide a decision and suggestion information. For example, if the cloud platform finds that an increase in blood pressure is caused by drinking, an MPS sends alarm information and a movement suggestion to an owner, such as stopping drinking, or limiting a drinking amount to a particular value. Certainly, the cloud platform may also communicate with the MPS, that is, perform configuration and management on parameters of the MPS, for example, an adult may log in to a cloud platform to perform remote configuration and management or the like on an MPS of a child, which is not limited in the present disclosure.

Figure 8:
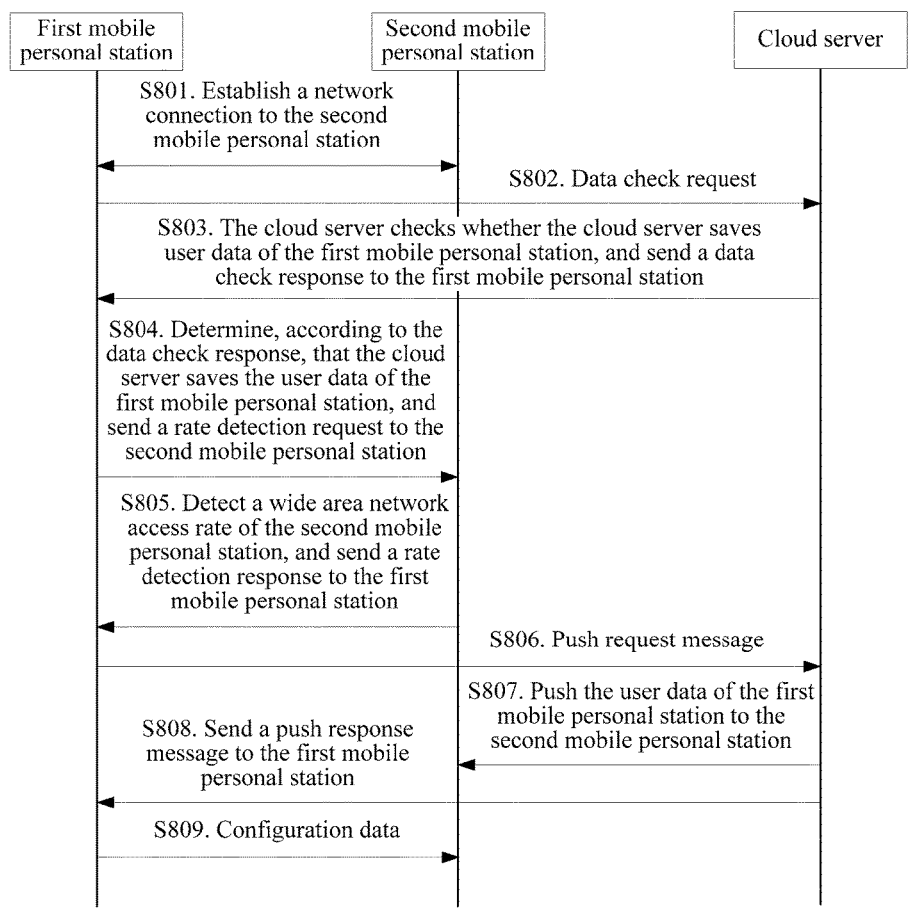
FIG. 8 is a schematic flowchart 7 of a method for data exchange between gateways according to an embodiment of the present invention.

Herein, FIG. 8 is used as an example for description and includes:

S801: A first mobile personal station establishes a network connection to a second mobile personal station.

S802: The first mobile personal station sends a data check request to a cloud server.

S803: The cloud server checks whether the cloud server saves user data of the first mobile personal station, and sends a data check response to the first mobile personal station.

S804: The first mobile personal station determines, according to the data check response, that the cloud server saves the user data of the first mobile personal station, and sends a rate detection request to the second mobile personal station.

It should be noted that, to ensure that the cloud server can push data to the second mobile personal station, before the first mobile personal station instructs the cloud server to push data, it may be determined that a wide area network access rate of the second mobile personal station meets a transmission condition.

S805: The second mobile personal station detects a wide area network access rate of the second mobile personal station, and sends a rate detection response to the first mobile personal station.

S806: The first mobile personal station sends a push request message to the cloud server.

S807: The cloud server pushes the user data of the first mobile personal station to the second mobile personal station.

S808: The cloud server sends a push response message to the first mobile personal station.

S809: The first mobile personal station sends configuration data of the first mobile personal station to the second mobile personal station.

It should be noted that, the configuration data is much smaller than the user data, and the first mobile personal station may directly send the configuration data to the second mobile personal station.

By means of the method steps shown in FIG. 8, the first mobile personal station may instruct the cloud server to send the user data to the second mobile personal station, so that a transmission rate is faster, and a user operation is more convenient.

In addition, the steps shown in FIG. 8 are only examples for description. For ease of description, the steps are described as a series of action combinations, but a person skilled in the art should know that, the present invention is not limited by a sequence of described actions, and secondly, a person skilled in the art should also know that, the embodiments described in the specification are preferred embodiments, and the involved actions are not necessarily needed by the embodiments of the present invention.

Figure 9:
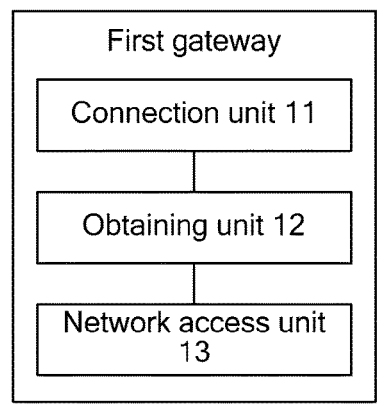
FIG. 9 is a schematic structural diagram 1 of a first gateway according to an embodiment of the present invention.

FIG. 9 is a schematic structural diagram of a gateway according to an embodiment of the present invention. The gateway provided in this embodiment of the present invention may be configured to implement the foregoing methods implemented in the embodiments of the present invention shown in FIG. 1 to FIG. 8. For ease of description, only a part related to this embodiment of the present invention is shown, and for specific technical details that are not disclosed, refer to the embodiments of the present invention shown in FIG. 1 to FIG. 8. Exemplarily, the gateway may be a first gateway, the first gateway is configured to manage a human body device of a first user, and the first gateway specifically includes:

a connection unit 11, configured to establish a network connection to a second gateway, where the second gateway is configured to manage a human body device of a second user;

an obtaining unit 12, configured to obtain collaboration information of the second gateway by using the network connection established by the connection establishment unit 11, where the collaboration information includes cellular network performance information; and a network access unit 13, configured to: if the cellular network performance information in the collaboration information obtaining unit 12 meets a preset performance condition, use the second gateway as an anchor for accessing the Internet, so as to connect the human body device of the first user to the Internet.

Further, the network access unit 13 is specifically configured to determine, according to the cellular network performance information, whether radio signal strength of the second gateway meets a preset strength threshold, and whether a network uplink/downlink access rate of the second gateway meets a rate threshold; and if the radio signal strength of the second gateway meets the preset strength threshold, and the network uplink/downlink access rate of the second gateway meets the rate threshold, use the second gateway as an anchor for accessing the Internet, where the cellular network performance information includes the radio signal strength and the network uplink/downlink access rate of the second gateway.

Further, the network access unit 13 is specifically configured to send a cellular network access agent request message to the second gateway, so that the second gateway determines, according to the cellular network access agent request message, whether to provide a cellular network access service to the first gateway; and if an access response message sent by the second gateway is received, change an uplink/downlink radio link of the first gateway to a local radio link between the first gateway and the second gateway according to the access response message, so that the second gateway is used as an anchor for the first gateway to access the Internet.

Figure 10:
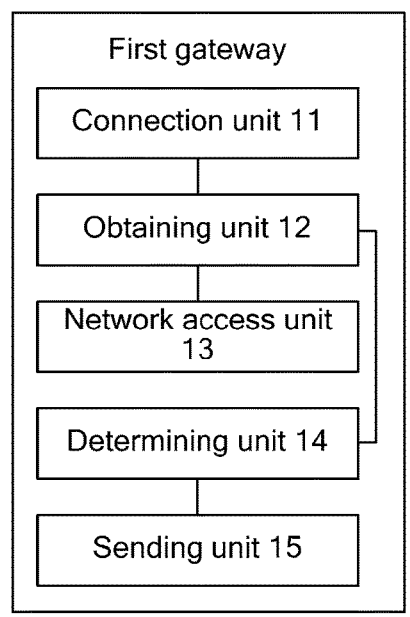
FIG. 10 is a schematic structural diagram 2 of a first gateway according to an embodiment of the present invention.

Further, the collaboration information in the collaboration information obtaining unit further includes location information of the second gateway. As shown in FIG. 10, the first gateway further includes a determining unit 14 and a sending unit 15, where the determining unit 14 is configured to determine, according to the location information of the second gateway, whether a distance between the first gateway and the second gateway meets a preset distance threshold, where the distance threshold includes a lower-limit distance threshold and an upper-limit distance threshold; and the sending unit 15 is configured to: if the distance between the first gateway and the second gateway is less than a preset lower-limit distance threshold, send an interference reduction request message to the human body device of the first gateway, so that the human body device of the first gateway decreases transmit power of the human body device; or if the distance between the first gateway and the second gateway is greater than a preset upper-limit distance threshold, send an interference removal notification message to the human body device of the first gateway, to remove a limitation on transmit power of the human body device of the first gateway.

Further, the sending unit 15 is further configured to: if the distance between the first gateway and the second gateway is less than the preset lower-limit distance threshold, send an interference reduction collaboration instruction to the second gateway, so that the second gateway sends an interference reduction request message to the human body device of the second gateway according to the interference reduction collaboration instruction.

Further, the sending unit 15 is further configured to: if the distance between the first gateway and the second gateway is greater than the preset upper-limit distance threshold, send an interference removal collaboration instruction to the second gateway, so that the second gateway sends an interference removal notification message to the human body device of the second gateway according to the interference removal collaboration instruction.

Figure 11:
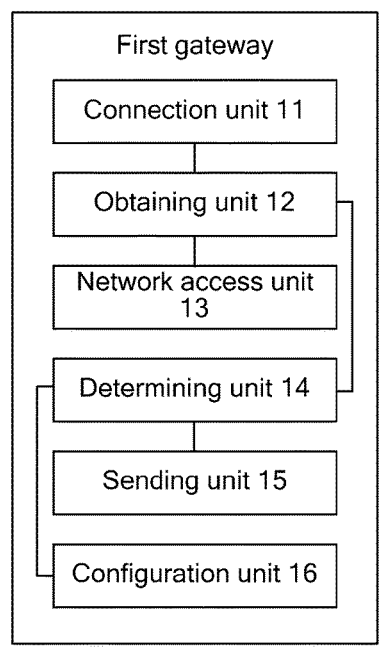
FIG. 11 is a schematic structural diagram 3 of a first gateway according to an embodiment of the present invention.

Further, the collaboration information in the collaboration information obtaining unit further includes configuration request information, where the configuration request message includes configuration information, and an identifier of the second gateway. As shown in FIG. 11, the first gateway further includes a configuration unit 16, where the determining unit 14 is further configured to determine, according to the identifier of the second gateway, whether the second gateway is managed by the first gateway; and the configuration unit 16 is configured to: if the second gateway is managed by the first gateway, configure the second gateway according to the configuration information.

Figure 12:
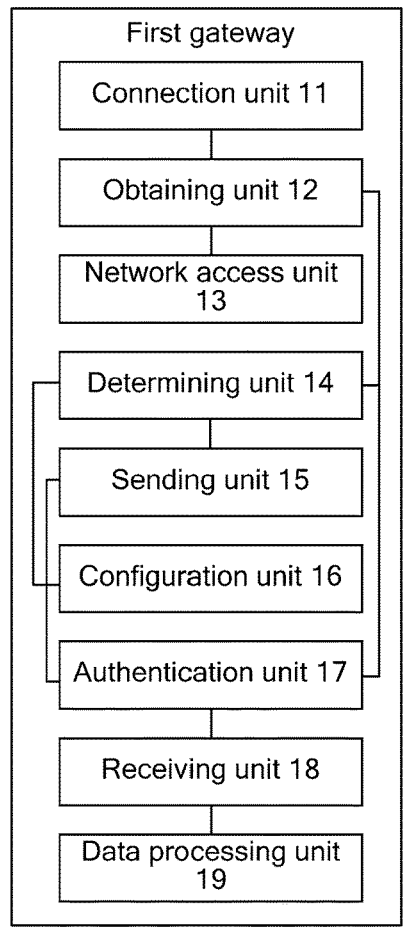
FIG. 12 is a schematic structural diagram 4 of a first gateway according to an embodiment of the present invention.

Further, the collaboration information in the collaboration information obtaining unit further includes data processing request information, where the data processing request message includes authentication information and a data processing type. As shown in FIG. 12, the first gateway further includes an authentication unit 17, a receiving unit 18, and a data processing unit 19, where the authentication unit 17 is configured to authenticate the second gateway according to the authentication information;

the sending unit 15 is further configured to: when the second gateway is authenticated by the first gateway successfully, send an authentication success message to the second gateway;

the receiving unit 18 is configured to receive data sent by the second gateway; and the data processing unit 19 is configured to process data in the receiving unit 18.

Further, the sending unit 15 is further configured to send user data of the first gateway to the second gateway; and send configuration data of the first gateway to the second gateway.

Further, the determining unit 14 is further configured to determine that a cloud server saves the user data of the first gateway; and the sending unit 15 is further configured to send a push request message to the cloud server, so that the cloud server sends the user data of the first gateway to the second gateway according to the push request message.

Figure 13:
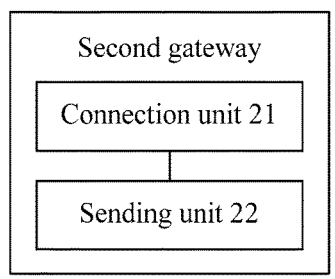
FIG. 13 is a schematic structural diagram 1 of a second gateway according to an embodiment of the present invention.

FIG. 13 is a schematic structural diagram of a gateway according to an embodiment of the present invention. The gateway provided in this embodiment of the present invention may be configured to implement the foregoing methods implemented in the embodiments of the present invention shown in FIG. 1 to FIG. 8. For ease of description, only a part related to this embodiment of the present invention is shown, and for specific technical details that are not disclosed, refer to the embodiments of the present invention shown in FIG. 1 to FIG. 8. Exemplarily, the gateway may be a second gateway, the second gateway is configured to manage a human body device of a second user, and the second gateway specifically includes:

a connection unit 21, configured to establish a network connection to a first gateway, where the first gateway is configured to manage a human body device of a first user, and the second gateway is configured to manage a human body device of a second user; and a sending unit 22, configured to send collaboration information to the first gateway by using the network connection established by the connection establishment unit 21, where the collaboration information includes cellular network performance information, so that the first gateway determines, according to the cellular network performance information, whether to use the second gateway as an anchor for accessing the Internet.

Figure 14:
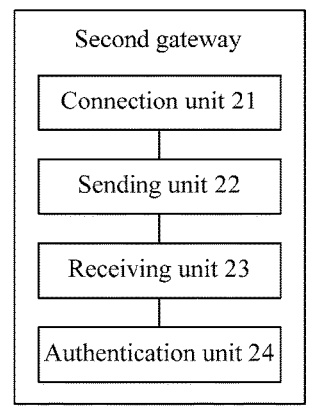
FIG. 14 is a schematic structural diagram 2 of a second gateway according to an embodiment of the present invention.

Further, as shown in FIG. 14, the second gateway further includes a receiving unit 23 and an authentication unit 24, where the receiving unit 23 is configured to receive a cellular network access agent request message sent by the first gateway;

the authentication unit 24 is configured to: when the cellular network access agent request message sent by the first gateway is received, authenticate the first gateway according to the cellular network access agent request message; and the sending unit 22 is further configured to: when the first gateway in the authentication unit 23 is authenticated successfully, send an access response message to the first gateway, so that the first gateway changes an uplink/downlink radio link of the first gateway to a local radio link between the first gateway and the second gateway according to the access response message.

Further, the receiving unit 23 is further configured to: if a distance between the first gateway and the second gateway is less than a preset lower-limit distance threshold, receive an interference reduction collaboration instruction sent by the first gateway; and the sending unit 22 is further configured to send an interference reduction request message to the human body device of the second gateway according to the interference reduction collaboration instruction in the receiving unit 23, where the collaboration information further includes location information of the second gateway.

Further, the receiving unit 23 is further configured to: if the distance between the first gateway and the second gateway is greater than a preset upper-limit distance threshold, receive an interference removal collaboration instruction sent by the first gateway; and the sending unit 22 is further configured to send an interference removal notification message to the human body device of the second gateway according to the interference removal collaboration instruction in the receiving unit 23.

Further, the receiving unit 23 is further configured to receive an authentication success message sent by the first gateway; and the sending unit 22 is further configured to send data to the first gateway, so that the first gateway processes the data according to the data processing type, where the collaboration information further includes data processing request information, where the data processing request message includes authentication information, and the data processing type.

Further, the receiving unit 23 is further configured to obtain user data of the first gateway from the first gateway; and receive configuration data of the first gateway that is sent by the first gateway.

Further, the receiving unit 23 is further configured to: when the first gateway determines that a cloud server saves the user data of the first gateway, receive the user data of the first gateway that is sent by the cloud server.

In addition, it should be noted that, the first gateway or the second gateway provided in this embodiment of the present invention may be specifically a mobile personal station (MPS), where the mobile personal station is a logical device unit configured to assist a person in performing communication, management, and data analysis on a human body device of the person.

The MPS may automatically determine a manner of communication (for example, individual networking such as Bluetooth, Wi-Fi, or ZigBee, or hybrid networking) between human body devices such as an implantable device, a wearable device, and a portable device, and maintain and optimize network running, and serve as a communications gateway between a human body device and the Internet. The MPS may be further responsible for performing a certain degree of data analysis on sensed data (such as a heart rate and blood pressure of a human body; a temperature and use of utilities in a family environment; and a running state of an automobile) collected from a human body and an environment (such as a family and an automobile), and perform data exchange with a cloud server; and the MPS may be integrated into a smart device or exist as an entity device, which is not limited in the present disclosure.

It can be seen that, the collaboration information of the second gateway is obtained, and further, a corresponding collaboration operation is performed according to the collaboration information. For example, the first gateway may perform collaboration with the second gateway according to the cellular network performance information in the collaboration information, and use the second gateway as an anchor for accessing the Internet, to further enhance an Internet access capability of the first gateway; or may perform collaboration with the second gateway according to the location information of the second gateway in the collaboration information, to reduce interference between the first gateway and the second gateway; or may perform collaboration with the second gateway according to the configuration request information in the collaboration information, to enhance a configuration capability of the second gateway; or may perform collaboration with the second gateway according to the data processing request information in the collaboration information, to enhance a data analysis capability of the first gateway. It can be seen that, by means of interaction between mobile personal stations, the mobile personal stations can better meet a requirement of a human body device, so that the human body device can provide a better service to a user, thereby improving user experience.

Figure 15:
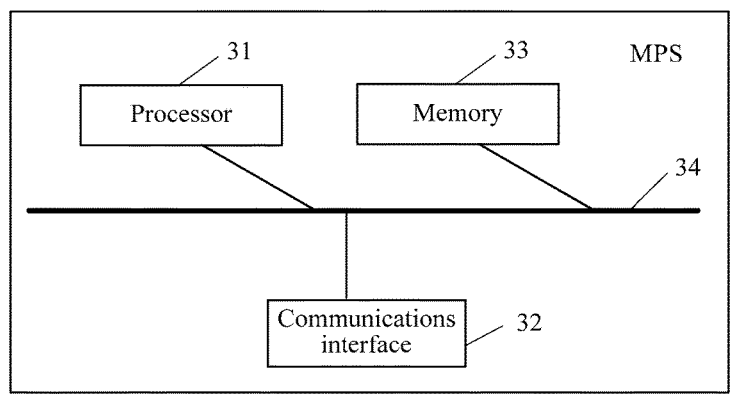
FIG. 15 is a schematic diagram of hardware of a mobile personal station according to an embodiment of the present invention.

FIG. 15 is a schematic diagram of hardware of a mobile personal station (MPS) according to an embodiment of the present invention. The mobile personal station may be the first gateway or the second gateway in the foregoing embodiments. The mobile personal station provided in this embodiment of the present invention may be configured to implement the foregoing methods implemented in the embodiments of the present invention shown in FIG. 1 to FIG. 8. For ease of description, only a part related to this embodiment of the present invention is shown, and for specific technical details that are not disclosed, refer to the embodiments of the present invention shown in FIG. 1 to FIG. 8.

As shown in FIG. 15, the mobile personal station includes a processor 31, a communications interface 32, a memory 33, and a bus 34.

The processor 31, the communications interface 32, and the memory 33 perform communication by using the bus 34.

The processor 31 is a control center of the mobile personal station, and the processor 31 performs various functions and data processing of the mobile personal station by running or executing a software program and/or a module stored in the memory 33, and invoking data stored in the memory 33.

The communications interface 32 may be implemented by an optical communications interface, an electrical communications interface, a wireless communications interface or any combination of the foregoing. For example, the optical communications interface may be a small form-factor pluggable (SFP) communications interface, an enhanced small form-factor pluggable (SFP+) communications interface, or a 10 Gigabit small form-factor pluggable communications interface. The electrical communications interface may be an Ethernet network interface controller (NIC). The wireless communications interface may be a wireless network interface controller (WNIC). A receive end may include multiple communications interfaces 32.

The memory 33 may be configured to store a software program or data, and the processor 31 performs various function applications and data processing of the mobile personal station by running the software program or the data stored in the memory 33.

In a possible implementation manner of this embodiment of the present invention, a processor 31 of a first mobile personal station establishes a network connection to a second mobile personal station by using a communications interface 32, where the first mobile personal station is configured to manage a human body device of a first user, and the second mobile personal station is configured to manage a human body device of a second user; and the communications interface 32 obtains collaboration information of the second mobile personal station by using the network connection, and sends the collaboration information to a memory 33, where the collaboration information includes cellular network performance information; and if the cellular network performance information meets a preset performance condition, the processor 31 uses the second mobile personal station as an anchor for accessing the Internet, so as to connect the human body device of the first user to the Internet.

The cellular network performance information includes radio signal strength and a network uplink/downlink access rate of the second mobile personal station; in this case, the using, by the processor 31, the second mobile personal station as an anchor for accessing the Internet may specifically include the following step: determining, by the processor 31 according to the cellular network performance information, whether the radio signal strength of the second mobile personal station meets a preset strength threshold, and whether the network uplink/downlink access rate of the second mobile personal station meets a rate threshold; and if the radio signal strength of the second mobile personal station meets the preset strength threshold, and the network uplink/downlink access rate of the second mobile personal station meets the rate threshold, using, by the processor 31, the second mobile personal station as an anchor for accessing the Internet.

Further, the using, by the processor 31, the second mobile personal station as an anchor for accessing the Internet may specifically include the following step: invoking, by the processor 31, the communications interface 32 to send a cellular network access agent request message to the second mobile personal station, so that the second mobile personal station determines, according to the cellular network access agent request message, whether to provide a cellular network access service to the first mobile personal station; and if the communications interface 32 receives an access response message sent by the second mobile personal station, changing, by the processor 31, an uplink/downlink radio link of the first mobile personal station to a local radio link between the first mobile personal station and the second mobile personal station according to the access response message, so that the second mobile personal station is used as an anchor for the first mobile personal station to access the Internet.

Further, the collaboration information further includes location information of the second mobile personal station; in this case, after the communications interface 32 obtains the collaboration information of the second mobile personal station by using the network connection, the following step may be further included: determining, by the processor 31 according to the location information of the second mobile personal station in the memory 33, whether a distance between the first mobile personal station and the second mobile personal station meets a preset distance threshold, where the distance threshold includes a lower-limit distance threshold and an upper-limit distance threshold; and if the distance between the first mobile personal station and the second mobile personal station is less than a preset lower-limit distance threshold, invoking, by the processor 31, the communications interface 32 to send an interference reduction request message to a human body device of the first mobile personal station, so that the human body device of the first mobile personal station decreases transmit power of the human body device; or if the distance between the first mobile personal station and the second mobile personal station is greater than a preset upper-limit distance threshold, invoking, by the processor 31, the communications interface 32 to send an interference removal notification message to the human body device of the first mobile personal station, to remove a limitation on transmit power of the human body device of the first mobile personal station.

Further, if the distance between the first mobile personal station and the second mobile personal station is less than the preset lower-limit distance threshold, the processor 31 invokes the communications interface 32 to send an interference reduction collaboration instruction to the second mobile personal station, so that the second mobile personal station sends an interference reduction request message to a human body device of the second mobile personal station according to the interference reduction collaboration instruction.

Further, if the distance between the first mobile personal station and the second mobile personal station is greater than the preset upper-limit distance threshold, the processor 31 invokes the communications interface 32 to send an interference removal collaboration instruction to the second mobile personal station, so that the second mobile personal station sends an interference removal notification message to a human body device of the second mobile personal station according to the interference removal collaboration instruction.

Further, the collaboration information further includes configuration request information, where the configuration request message includes configuration information, and an identifier of the second mobile personal station; in this case, after the communications interface 32 obtains the collaboration information of the second mobile personal station by using the network connection, the following step may be further included: determining, by the processor 31 according to the identifier of the second mobile personal station in the memory 33, whether the second mobile personal station is managed by the first mobile personal station; and if the second mobile personal station is managed by the first mobile personal station, configuring, by the processor 31, the second mobile personal station according to the configuration information.

Further, the collaboration information further includes data processing request information, where the data processing request message includes authentication information and a data processing type; in this case, after the communications interface 32 obtains the collaboration information of the second mobile personal station by using the network connection, the following step may be further included: authenticating, by the processor 31, the second mobile personal station according to the authentication information in the memory 33; when the second mobile personal station is authenticated by the first mobile personal station successfully, invoking, by the processor 31, the communications interface 32 to send an authentication success message to the second mobile personal station, and receive data sent by the second mobile personal station and send the data to the memory 33; and processing, by the processor 31, the data according to the data type in the memory 33.

Further, after the processor 31 of the first mobile personal station establishes the network connection to the second mobile personal station by using the communications interface 32, the following step may be further included: sending, by the processor 31, user data of the first mobile personal station to the second mobile personal station by using the communications interface 32; and sending configuration data of the first mobile personal station to the second mobile personal station by using the communications interface 32.

Further, the sending, by the processor 31, user data of the first mobile personal station to the second mobile personal station by using the communications interface 32 may specifically include the following step: determining, by the processor 31, whether a cloud server saves the user data of the first mobile personal station; and when the cloud server saves the user data of the first mobile personal station, invoking, by the processor 31, the communications interface 32 to send a push request message to the cloud server, so that the cloud server sends the user data of the first mobile personal station to the second mobile personal station according to the push request message.

In another possible implementation manner of this embodiment of the present invention, a processor 31 of a second mobile personal station establishes a network connection to a first mobile personal station by using a communications interface 32, the first mobile personal station is configured to manage a human body device of a first user, and the second mobile personal station is configured to manage a human body device of a second user; and the processor 31 invokes, by using the network connection, the communications interface 32 to send collaboration information to the first mobile personal station, where the collaboration information includes cellular network performance information, so that the first mobile personal station determines, according to the cellular network performance information, whether to use the second mobile personal station as an anchor for accessing the Internet.

Further, after the processor 31 invokes, by using the network connection, the communications interface 32 to send the collaboration information to the first mobile personal station, the following step may further be included: when receiving a cellular network access agent request message sent by the first mobile personal station, sending, by the communications interface 32, the cellular network access agent request message to the processor 31; and authenticating, by the processor 31, the first mobile personal station according to the cellular network access agent request message; and when the first mobile personal station is authenticated successfully, invoking, by the processor 31, the communications interface 32 to send an access response message to the first mobile personal station, so that the first mobile personal station changes an uplink/downlink radio link of the first mobile personal station to a local radio link between the first mobile personal station and the second mobile personal station according to the access response message.

Further, the collaboration information further includes location information of the second mobile personal station; in this case, after the processor 31 invokes, by using the network connection, the communications interface 32 to send the collaboration information to the first mobile personal station, the following step may be further included: if a distance between the first mobile personal station and the second mobile personal station is less than a preset lower-limit distance threshold, receiving, by the communications interface 32, an interference reduction collaboration instruction sent by the first mobile personal station and sending the interference reduction collaboration instruction to the processor 31; and sending, by the processor 31, an interference reduction request message to a human body device of the second mobile personal station according to the interference reduction collaboration instruction by using the communications interface 32.

Further, if the distance between the first mobile personal station and the second mobile personal station is greater than a preset upper-limit distance threshold, the communications interface 32 receives an interference removal collaboration instruction sent by the first mobile personal station and sends the interference removal collaboration instruction to the processor 31; and the processor 31 sends an interference removal notification message to the human body device of the second mobile personal station according to the interference removal collaboration instruction by using the communications interface 32.

Further, the collaboration information further includes data processing request information, where the data processing request message includes authentication information and a data processing type; in this case, after the processor 31 invokes, by using the network connection, the communications interface 32 to send the collaboration information to the first mobile personal station, the following step may be further included: receiving, by the communications interface 32, an authentication success message sent by the first mobile personal station and sending the authentication success message to the processor 31; and sending, by the processor 31, data to the first mobile personal station by using the communications interface 32, so that the first mobile personal station processes the data according to the data processing type.

Further, after the processor 31 of the second mobile personal station establishes the network connection to the first mobile personal station by using the communications interface 32, the following step may be further included: obtaining, by the processor 31, user data of the first mobile personal station from the first mobile personal station; and invoking the communications interface 32 to receive configuration data of the first mobile personal station that is sent by the first mobile personal station.

Further, when the processor 31 obtains the user data of the first mobile personal station from the first mobile personal station, the following may be specifically included: when the first mobile personal station determines that a cloud server saves the user data of the first mobile personal station, receiving, by the processor 31 by using the communications interface 32, the user data of the first mobile personal station that is sent by the cloud server.

In this way, the first mobile personal station obtains the collaboration information of the second mobile personal station, and further performs a corresponding collaboration operation according to the collaboration information. For example, the first mobile personal station may perform collaboration with the second mobile personal station according to the cellular network performance information in the collaboration information, and use the second mobile personal station as an anchor for accessing the Internet, to further enhance an Internet access capability of the first mobile personal station; or may perform collaboration with the second mobile personal station according to the location information of the second mobile personal station in the collaboration information, to reduce interference between the first mobile personal station and the second mobile personal station; or may perform collaboration with the second mobile personal station according to the configuration request information in the collaboration information, to enhance a configuration capability of the second mobile personal station; or may perform collaboration with the second mobile personal station according to the data processing request information in the collaboration information, to enhance a data analysis capability of the first mobile personal station. It can be seen that, by means of interaction between mobile personal stations, the mobile personal stations can better meet a requirement of a human body device, so that the human body device can provide a better service to a user, thereby improving user experience.

Figure 16:
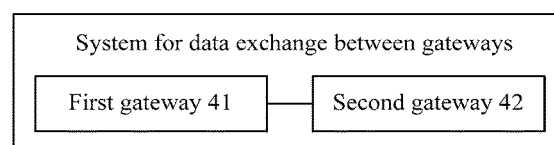
FIG. 16 is a schematic structural diagram 1 of a system for data exchange between gateways according to an embodiment of the present invention.

FIG. 16 is a system for data exchange between gateways according to an embodiment of the present invention, which includes a first gateway 41, and a second gateway 42 connected to the first gateway 41.

Specifically, both the first gateway 41 and the second gateway 42 may be any mobile personal station, and the system for data exchange between gateways provided in this embodiment of the present invention may be configured to implement the foregoing methods implemented in the embodiments of the present invention shown in FIG. 1 to FIG. 8. For ease of description, only a part related to this embodiment of the present invention is shown, and for specific technical details that are not disclosed, refer to the embodiments of the present invention shown in FIG. 1 to FIG. 8.

Figure 17:
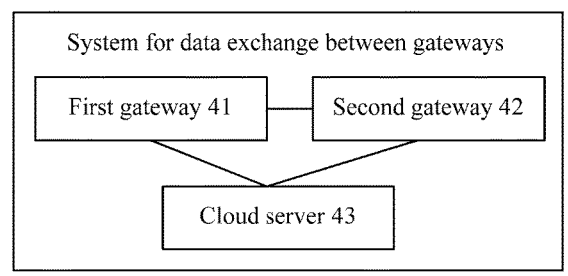
FIG. 17 is a schematic structural diagram 2 of a system for data exchange between gateways according to an embodiment of the present invention.

Further, as shown in FIG. 17, the system for data exchange between gateways may further include a first gateway 41, and a cloud server 43 connected to the second gateway 42.

This embodiment of the present invention may involve one or more cloud servers 43, for example, a cloud platform formed by multiple cloud servers 43, where the cloud platform may store information and historical data of each user, and when performing cloud computing, the cloud platform may perform deep and accurate calculation by invoking the information and historical data of each user.

Specifically, the cloud platform may be configured to store sensed data generated by each human body device; and perform data analysis on sensed data collected from each human body device, and extract a change feature and rule of the data. For example, the cloud platform may calculate a change rule of blood pressure of a human body in a year, a change rule of alcohol content of a human body in a year, or the like. In addition, the cloud platform may also perform association analysis according to a data analysis result, and provide a decision and suggestion information. For example, if the cloud platform finds that an increase in blood pressure is caused by drinking, an MPS sends alarm information and a movement suggestion to an owner, such as stopping drinking, or limiting a drinking amount to a particular value. Certainly, the cloud platform may also communicate with the MPS, that is, perform configuration and management on parameters of the MPS, for example, an adult may log in to a cloud platform to perform remote configuration and management or the like on an MPS of a child, which is not limited in the present disclosure.

In this embodiment of the present invention, a first mobile personal station and a second mobile personal station have a requirement for function migration; therefore, the first mobile personal station and the second mobile personal station may perform data exchange with the cloud server 43, and migrate configuration data and user data of the first mobile personal station to the second mobile personal station, to complete function migration. For the method in which the first mobile personal station and the second mobile personal station perform data exchange with the cloud server 43, reference may be specifically made to step S801 to step S804, and details are not described herein again.

By means of the foregoing solution, the first mobile personal station obtains collaboration information of the second mobile personal station, and further performs a corresponding collaboration operation according to the collaboration information. For example, the first mobile personal station may perform collaboration with the second mobile personal station according to cellular network performance information in the collaboration information, and use the second mobile personal station as an anchor for accessing the Internet, to further enhance an Internet access capability of the first mobile personal station; or may perform collaboration with the second mobile personal station according to location information of the second mobile personal station in the collaboration information, to reduce interference between the first mobile personal station and the second mobile personal station; or may perform collaboration with the second mobile personal station according to configuration request information in the collaboration information, to enhance a configuration capability of the second mobile personal station; or may perform collaboration with the second mobile personal station according to data processing request information in the collaboration information, to enhance a data analysis capability of the first mobile personal station. It can be seen that, by means of interaction between mobile personal stations, the mobile personal stations can better meet a requirement of a human body device, so that the human body device can provide a better service to a user, thereby improving user experience.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A method for a first mobile device of a first user using a second mobile device of a second user as an anchor for accessing the Internet, comprising:
   determining, by the first mobile device, that cellular network performance of the first mobile device does not meet a preset performance condition, wherein the first mobile device is configured to manage a human body device of the first user;
   establishing, by the first mobile device, a connection with the second mobile device, wherein the second mobile device is configured to manage a human body device of a second user;
   receiving, by the first mobile device, collaboration information of the second mobile device via the connection, wherein the collaboration information comprises cellular network performance information of the second mobile device;
   determining, by the first mobile device, based on the cellular network performance information of the second mobile device, that cellular network performance of the second mobile device meets the preset performance condition; and
   based on the cellular network performance of the second mobile device meeting the preset performance condition, using, by the first mobile device, the second mobile device as an anchor for accessing the Internet to connect the human body device of the first user to the Internet.

2. The method according to claim 1, wherein the cellular network performance information of the second mobile device comprises radio signal strength and a network uplink/downlink access rate of the second mobile device; and
   wherein using the second mobile device as an anchor for accessing the Internet based on the cellular network performance of the second mobile device meeting the preset performance condition further comprises:
      determining, by the first mobile device according to the cellular network performance information of the second mobile device, whether the radio signal strength of the second mobile device meets a preset strength threshold, and whether the network uplink/downlink access rate of the second mobile device meets a rate threshold; and
      based on the radio signal strength of the second mobile device meeting the preset strength threshold and the network uplink/downlink access rate of the second mobile device meeting the rate threshold, using, by the first mobile device, the second mobile device as an anchor for accessing the Internet.

3. The method according to claim 1, wherein using the second mobile device as an anchor for accessing the Internet further comprises:
   sending, by the first mobile device, a cellular network access agent request message to the second mobile device to facilitate the second mobile device determining, according to the cellular network access agent request message, whether to provide a cellular network access service to the first mobile device; and
   based on the first mobile device receiving an access response message sent by the second mobile device, changing, by the first mobile device, an uplink/downlink radio link of the first mobile device to a local radio link between the first mobile device and the second mobile device according to the access response message to facilitate the second mobile device being used as an anchor for the first mobile device to access the Internet.

4. The method according to claim 1, wherein the collaboration information of the second mobile device further comprises location information of the second mobile device; and
   wherein after receiving the collaboration information of the second mobile device, the method further comprises:
      determining, by the first mobile device according to the location information of the second mobile device, whether a distance between the first mobile device and the second mobile device meets a preset distance condition, wherein the preset distance condition comprises a lower-limit distance threshold and an upper-limit distance threshold; and
      based on the distance between the first mobile device and the second mobile device being less than the lower-limit distance threshold, sending, by the first mobile device, an interference reduction request message to the human body device of the first user, to facilitate the human body device of the first user decreasing its transmit power; or based on the distance between the first mobile device and the second mobile device being greater than the upper-limit distance threshold, sending, by the first mobile device, an interference removal notification message to the human body device of the first user, to facilitate removing a limitation on transmit power of the human body device of the first user.

5. The method according to claim 1, wherein the collaboration information of the second mobile device further comprises configuration request information, wherein the configuration request information comprises configuration information, and an identifier of the second mobile device; and
   wherein after receiving the collaboration information of the second mobile device, the method further comprises:
      determining, by the first mobile device according to the identifier of the second mobile device, whether the second mobile device is managed by the first mobile device; and
      based on the second mobile device being managed by the first mobile device, configuring, by the first mobile device, the second mobile device according to the configuration information.

6. The method according to claim 1, wherein the collaboration information of the second mobile device further comprises data processing request information, wherein the data processing request information comprises authentication information and a data processing type; and wherein after receiving the collaboration information of the second mobile device, the method further comprises:
  authenticating, by the first mobile device, the second mobile device according to the authentication information;
  based on the second mobile device being authenticated by the first mobile device successfully, sending, by the first mobile device, an authentication success message to the second mobile device;
  receiving, by the first mobile device, data sent by the second mobile device; and
  processing, by the first mobile device, the data according to the data processing type.

7. A method for a first mobile device of a first user using a second mobile device of a second user as an anchor for accessing the Internet, comprising:
  establishing, by the second mobile device, a connection with the first mobile device, wherein the first mobile device is configured to manage a human body device of a first user, and the second mobile device is configured to manage a human body device of a second user;
  sending, by the second mobile device, collaboration information to the first mobile device via the connection, wherein the collaboration information comprises cellular network performance information of the second mobile device, to facilitate the first mobile device determining, according to the cellular network performance information of the second mobile device, whether to use the second mobile device as an anchor for accessing the Internet; and
  serving, by the second mobile device, as an anchor to the first mobile device for accessing the Internet to connect the human body device of the first user to the Internet.

8. The method according to claim 7, wherein after sending the collaboration information of the second mobile device to the first mobile device, the method further comprises:
  receiving a cellular network access agent request message from the first mobile device;
  authenticating, by the second mobile device, the first mobile device according to the cellular network access agent request message; and
  based on the first mobile device being authenticated successfully, sending, by the second mobile device, an access response message to the first mobile device, to facilitate the first mobile device changing an uplink/downlink radio link of the first mobile device to a local radio link between the first mobile device and the second mobile device according to the access response message.

9. The method according to claim 7, wherein the collaboration information of the second mobile device further comprises data processing request information, wherein the data processing request information comprises authentication information and a data processing type; and
  wherein after sending the collaboration information of the second mobile device to the first mobile device, the method further comprises:
    receiving, by the second mobile device, an authentication success message from the first mobile device; and
    sending, by the second mobile device, data to the first mobile device to facilitate the first mobile device processing the data according to the data processing type.

10. A first mobile device of a first user, comprising a processor and a non-transitory computer-readable medium having processor-executable instructions stored thereon for the first mobile device of the first user using a second mobile device of a second user as an anchor for accessing the Internet, wherein the processor-executable instructions, when executed, facilitate performance of the following:
  determining that cellular network performance of the first mobile device does not meet a preset performance condition, wherein the first mobile device is configured to manage a human body device of the first user;
  establishing a connection with the second mobile device, wherein the second mobile device is configured to manage a human body device of a second user;
  receiving collaboration information of the second mobile device via the connection, wherein the collaboration information comprises cellular network performance information of the second mobile device; and
  if the cellular network performance information of the second mobile device meets the preset performance condition, using the second mobile device as an anchor for accessing the Internet to connect the human body device of the first user to the Internet.

11. The first mobile device according to claim 10, wherein the processor-executable instructions, when executed, further facilitate:
  determining, according to the cellular network performance information of the second mobile device, whether radio signal strength of the second mobile device meets a preset strength threshold, and whether a network uplink/downlink access rate of the second mobile device meets a rate threshold; and
  if the radio signal strength of the second mobile device meets the preset strength threshold, and the network uplink/downlink access rate of the second mobile device meets the rate threshold, determining that the cellular network performance information of the second mobile device meets the preset performance condition;
  wherein the cellular network performance information of the second mobile device comprises the radio signal strength and the network uplink/downlink access rate of the second mobile device.

12. The first mobile device according to claim 10, wherein the processor-executable instructions, when executed, further facilitate:
  sending a cellular network access agent request message to the second mobile device, to facilitate the second mobile device determining, according to the cellular network access agent request message, whether to provide a cellular network access service to the first mobile device; and
  if an access response message sent by the second mobile device is received, changing an uplink/downlink radio link of the first mobile device to a local radio link between the first mobile device and the second mobile device according to the access response message, to facilitate the second mobile device being used as an anchor for the first mobile device to access the Internet.

13. The first mobile device according to claim 10, wherein the collaboration information of the second mobile device further comprises location information of the second mobile device; and
  wherein the processor-executable instructions, when executed, further facilitate:
    determining, according to the location information of the second mobile device, whether a distance between the first mobile device and the second mobile device meets a preset distance condition, wherein the preset distance condition comprises a lower-limit distance threshold and an upper-limit distance threshold; and if the distance between the first mobile device and the second mobile device is less than the lower-limit distance threshold, sending an interference reduction request message to the human body device of the first user, to facilitate the human body device of the first user decreasing its transmit power; or if the distance between the first mobile device and the second mobile device is greater than the upper-limit distance threshold, sending an interference removal notification message to the human body device of the first user, to facilitate removing a limitation on transmit power of the human body device of the first user.

14. The first mobile device according to claim 13, wherein the processor-executable instructions, when executed, further facilitate:

if the distance between the first mobile device and the second mobile device is greater than the upper-limit distance threshold, sending an interference removal collaboration instruction to the second mobile device, to facilitate the second mobile device sending an interference removal notification message to the human body device of the second gateway user according to the interference removal collaboration instruction.

15. The first mobile device according to claim 10, wherein the collaboration information of the second mobile device further comprises configuration request information, wherein the configuration request information comprises configuration information, and an identifier of the second mobile device; and wherein the processor-executable instructions, when executed, further facilitate:
determining, according to the identifier of the second mobile device, whether the second mobile device is managed by the first mobile device; and
if the second mobile device is managed by the first mobile device, configuring the second mobile device according to the configuration information.

16. The first mobile device according to claim 10, wherein the collaboration information of the second mobile device further comprises data processing request information, wherein the data processing request information comprises authentication information and a data processing type; and wherein the processor-executable instructions, when executed, further facilitate:
authenticating the second mobile device according to the authentication information;
when the second mobile device is authenticated by the first mobile device successfully, sending an authentication success message to the second mobile device;
receiving data sent by the second mobile device; and
processing the data.

17. A second mobile device of a second user, wherein the second mobile device comprises a processor and a non-transitory computer-readable medium having processor-executable instructions stored thereon for a first mobile device of a first user using the second mobile device of the second user as an anchor for accessing the Internet, wherein the processor-executable instructions, when executed, facilitate performance of the following:

establishing a connection with the first mobile device, wherein the first mobile device is configured to manage a human body device of the first user, and the second mobile device is configured to manage a human body device of the second user;

sending collaboration information of the second mobile device to the first mobile device via the connection, wherein the collaboration information of the second mobile device comprises cellular network performance information of the second mobile device, to facilitate the first mobile device determining, according to the cellular network performance information of the second mobile device, whether to use the second mobile device as an anchor for accessing the Internet; and serving as an anchor to the first mobile device for accessing the Internet to connect the human body device of the first user to the Internet.

18. The second mobile device according to claim 17, wherein the processor-executable instructions, when executed, further facilitate:

receiving a cellular network access agent request message sent by the first mobile device;

authenticating the first mobile device according to the cellular network access agent request message; and after the first mobile device is authenticated successfully, sending an access response message to the first mobile device, to facilitate the first mobile device changing an uplink/downlink radio link of the first mobile device to a local radio link between the first mobile device and the second mobile device according to the access response message.

19. The second mobile device according to claim 17, wherein the processor-executable instructions, when executed, further facilitate:

receiving an authentication success message sent by the first mobile device; and sending data to the first mobile device, to facilitate the first mobile device processing the data according to a data processing type;

wherein the collaboration information further comprises data processing request information, wherein the data processing request information comprises authentication information and the data processing type.

* * * * *